United States Patent
Gafa et al.

(10) Patent No.: US 12,177,219 B1
(45) Date of Patent: *Dec. 24, 2024

(54) AUTOMATED METHODS AND SYSTEMS FOR GRANTING COMPLEX PERMISSIONS

(71) Applicant: PARALLELS INTERNATIONAL GmbH, Schaffhausen (CH)

(72) Inventors: Paul Gafa, Sliema (MT); Nikolay Dobrovolskiy, Moscow (RU)

(73) Assignee: Parallels International GmbH, Schaffhausen (CH)

(*) Notice: Subject to any disclaimer, the term of this patent is extended or adjusted under 35 U.S.C. 154(b) by 0 days.

This patent is subject to a terminal disclaimer.

(21) Appl. No.: 18/449,203

(22) Filed: Aug. 14, 2023

Related U.S. Application Data

(60) Continuation of application No. 17/578,890, filed on Jan. 19, 2022, now Pat. No. 11,729,172, which is a division of application No. 17/036,639, filed on Sep. 29, 2020, now Pat. No. 11,381,563.

(51) Int. Cl.
*H04L 9/40* (2022.01)

(52) U.S. Cl.
CPC .................. *H04L 63/10* (2013.01)

(58) Field of Classification Search
CPC . G06F 21/6218; H04L 63/101; H04L 63/102; H04L 63/104; H04L 63/20; H04L 63/10
See application file for complete search history.

(56) References Cited

U.S. PATENT DOCUMENTS

| | | | |
|---|---|---|---|
| 9,135,457 B1* | 9/2015 | Arnaudov | G06F 21/604 |
| 9,979,732 B2* | 5/2018 | Lehane | G06F 21/10 |
| 10,810,361 B1* | 10/2020 | Venkatraman | H04L 63/0421 |
| 10,902,369 B2* | 1/2021 | Chetlur | G06Q 10/1053 |
| 11,063,951 B1* | 7/2021 | Bergman | H04L 63/104 |
| 11,381,563 B1* | 7/2022 | Gafa | H04L 63/102 |
| 11,729,172 B1* | 8/2023 | Gafa | H04L 63/10 726/4 |
| 2002/0026592 A1* | 2/2002 | Gavrila | G06F 21/6218 709/229 |
| 2008/0072316 A1* | 3/2008 | Chang | G06F 12/1458 726/21 |
| 2011/0277012 A1* | 11/2011 | Carter | H04L 63/10 726/1 |

(Continued)

*Primary Examiner* — David R Lazaro
(74) *Attorney, Agent, or Firm* — Rosenberg, Klein & Lee

(57) ABSTRACT

A permissions management system (PMS) defines the permissions associated with a user and thereby the activities the user can perform with any specific object and/or application or class of objects and/or applications. However, such a PMS requires an administrator to either authorise each permission individually or default permissions to a configuration previously established. The former is time consuming and the latter does not eliminate the former in establishing the roles initially or new roles or custom configurations. Accordingly, methods and systems for automating the establishment of permissions and their ongoing maintenance are presented based upon an initial discovery phase of actions performed by either the user or an administrator followed by an automated harmonization phase and a verification phase. This verification phase may employ human interactions or be automated exploiting an artificial intelligence engine.

5 Claims, 11 Drawing Sheets

(56) References Cited

U.S. PATENT DOCUMENTS

| | | | |
|---|---|---|---|
| 2011/0296490 A1* | 12/2011 | Faitelson | G06F 21/6218 |
| | | | 726/1 |
| 2012/0159566 A1* | 6/2012 | Hrastnik | G06F 21/6218 |
| | | | 726/21 |
| 2014/0157350 A1* | 6/2014 | Wang | G06F 21/6218 |
| | | | 726/1 |
| 2014/0181912 A1* | 6/2014 | Kling | H04L 63/102 |
| | | | 726/4 |
| 2015/0135305 A1* | 5/2015 | Cabrera | G06F 21/62 |
| | | | 726/17 |
| 2017/0286265 A1* | 10/2017 | Moth | G06F 11/3688 |
| 2018/0027118 A1* | 1/2018 | Sharpe | H04M 3/42068 |
| | | | 379/265.11 |
| 2018/0288616 A1* | 10/2018 | Knox | H04W 12/08 |
| 2019/0230088 A1* | 7/2019 | Rice | G06F 21/604 |
| 2020/0143328 A1* | 5/2020 | Chen | G06F 21/629 |
| 2020/0206920 A1* | 7/2020 | Ma | G06Q 10/0633 |
| 2021/0103649 A1* | 4/2021 | Korus | G06F 9/4881 |
| 2021/0144144 A1* | 5/2021 | Parks | H04L 63/20 |
| 2021/0248556 A1* | 8/2021 | Venkatraman | G06Q 10/103 |
| 2021/0409432 A1* | 12/2021 | Reardon | H04L 63/1425 |
| 2022/0078195 A1* | 3/2022 | Sehgal | H04L 63/20 |

\* cited by examiner

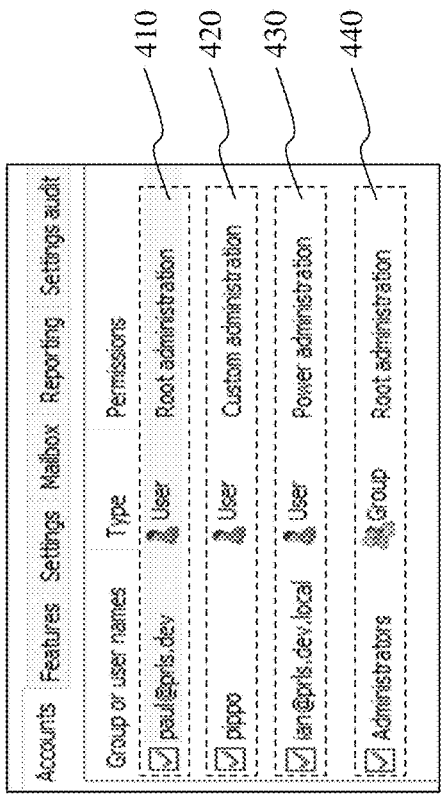

Figure 4

| Account Permissions | | Level | | | |
|---|---|---|---|---|---|
| Permission | Provides | Network | System | Application |
| Create | Ability to create new file(s) | | | ✓ |
| Enumerate | Ability for user to generate a list or catalog of items | ✓ | | ✓ |
| Read | Ability to open and read file(s) | | | ✓ |
| Write | Ability to save edits made to file(s) opened with Read permission | | | ✓ |
| Control | Ability for user to set access permissions for file(s) with respect to other users | | ✓ | ✓ |
| Delete | Ability for user to delete file(s) | | | ✓ |
| Sign | Ability for user to digitally sign file(s) | | | ✓ |
| Hierarchy | Ability for user to open higher levels of hierarchy | | ✓ | ✓ |
| Map | Ability for user to map a network drive | ✓ | ✓ | |
| Network | Ability for user to access network / search remote drive(s) etc. | ✓ | | |

Figure 5

AUTOMATED METHODS AND SYSTEMS FOR GRANTING COMPLEX PERMISSIONS

CROSS-REFERENCE TO RELATED APPLICATIONS

This patent application claims the benefit of priority as a continuation patent application of U.S. patent application Ser. No. 17/578,890 filed Jan. 19, 2022; which itself claims the benefit of priority as a divisional patent application of U.S. patent application Ser. No. 17/036,639 filed Sep. 29, 2020 which has issued as U.S. Pat. No. 11,381,563; the entire contents of which are incorporated herein by reference.

FIELD OF THE INVENTION

This patent application relates to permissions management and more particularly to automated and semi-automated methods and systems for granting complex permissions to a user or a class of users.

BACKGROUND OF THE INVENTION

A permissions management system (PMS) defines the permissions associated with a user and thereby the activities the user can perform with any specific object and/or application or class of objects and/or applications. However, such a PMS requires an administrator to either authorise each permission individually or default permissions to a configuration previously established. The former is time consuming and the latter does not eliminate the former in establishing the roles initially or new roles or custom configurations.

According, it would be beneficial to provide methods and systems for automating the establishment of permissions and their ongoing maintenance. Accordingly, the inventors have established methods and systems based upon an initial discovery phase of actions performed by either the user or an administrator followed by an automated harmonization phase and a verification phase. This verification phase may employ human interactions or be automated exploiting an artificial intelligence engine.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to mitigate limitations within the prior art relating to permissions management and more particularly to automated and semi-automated methods and systems for granting complex permissions to a user or a class of users.

In accordance with an embodiment of the invention there is provided a method comprising
  establishing upon a system comprising at least a microprocessor an impersonation role as a delegated user for an impersonator where the delegated user is associated with a user of the system;
  executing by the impersonator a session as the delegated user;
  simulating a plurality of actions within the session undertaken by the impersonator within the session where each action is an action to be performed by the user and is associated with an object forming part of the system, a permission for performing the action upon the object, and a context of the action upon the object;
  harmonizing with the system the objects, permissions and contexts associated with the plurality of actions; and
  establishing a subset of the harmonized objects, permissions, and contexts as a profile for the user.

In accordance with an embodiment of the invention there is provided a method comprising:
  establishing upon a system comprising at least a microprocessor a training session for a user of the system by an impersonator of the system;
  executing the training session by the user;
  monitoring a plurality of actions within the session undertaken by the user within the training session where each action is an action associated with an object forming part of the system, a permission for performing the action upon the object, and a context of the action upon the object;
  harmonizing with the system the objects, permissions and contexts associated with the plurality of actions;
  establishing verification of a subset of the harmonized objects, permissions, and contexts with a first verification process; and
  establishing the subset of the harmonized objects, permissions, and contexts verified by the administrator as a profile for the user.

In accordance with an embodiment of the invention there is provided a method comprising:
  executing an automatic monitoring phase with respect to a current profile of a user based upon actions of the user upon a system; and
  consolidating accumulated data on objects, permissions and contexts employed by the user during the automatic monitoring phase; and
  modifying the profile of the user by applying a process comprising:
  removing unused objects, permissions and objects from the profile of the user in dependence upon the consolidated accumulated data on the objects, permissions and contexts employed by the user; and
  adding new objects, permissions and objects established in dependence upon the consolidated accumulated data on the objects, permissions and contexts employed by the user and a first verification process.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 4 depicts an exemplary graphical user interface (GUI) within a software application showing accounts associated with a system and the permissions associated with the accounts;

FIG. 5 depicts an exemplary list of permissions which can be assigned to a user or class of users and their associated levels;

DETAILED DESCRIPTION

Figure 1:
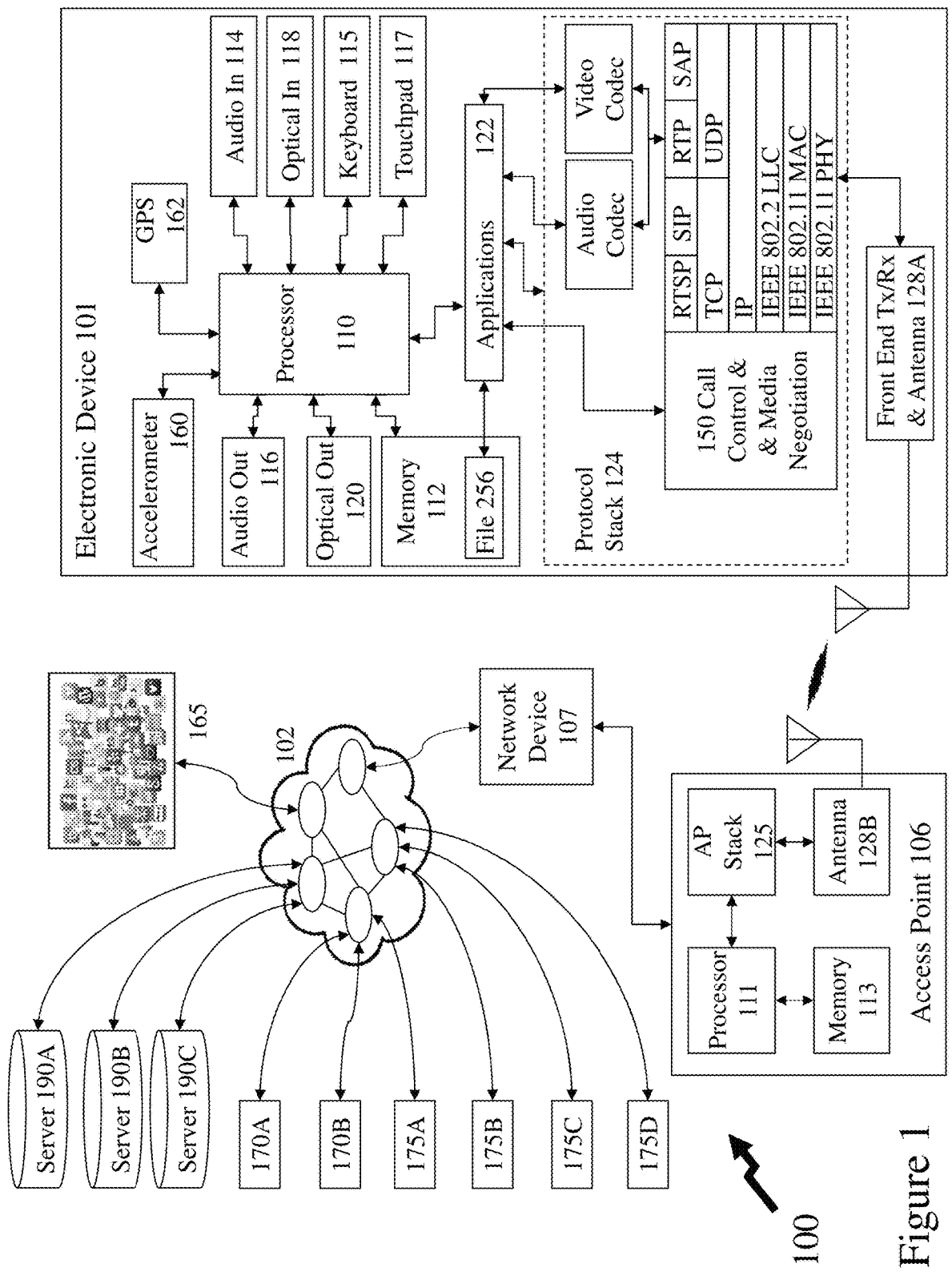
FIG. 1 depicts an exemplary electronic device and network supporting embodiments of the invention.

The present description is directed to electronic content and more particularly to methods permissions management and more particularly to automated and semi-automated methods and systems for granting complex permissions to a user or a class of users.

The ensuing description provides representative embodiment(s) only, and is not intended to limit the scope, applicability, or configuration of the disclosure. Rather, the ensuing description of the embodiment(s) will provide those skilled in the art with an enabling description for implementing an embodiment or embodiments of the invention. It being understood that various changes can be made in the function and arrangement of elements without departing from the spirit and scope as set forth in the appended claims. Accordingly, an embodiment is an example or implementation of the inventions and not the sole implementation. Various appearances of "one embodiment," "an embodiment" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention can also be implemented in a single embodiment or any combination of embodiments.

Reference in the specification to "one embodiment", "an embodiment", "some embodiments" or "other embodiments" means that a particular feature, structure, or characteristic described in connection with the embodiments is included in at least one embodiment, but not necessarily all embodiments, of the inventions. The phraseology and terminology employed herein is not to be construed as limiting but is for descriptive purposes only. It is to be understood that where the claims or specification refer to "a" or "an" element, such reference is not to be construed as there being only one of that element. It is to be understood that where the specification states that a component feature, structure, or characteristic "may", "might", "can" or "could" be included, that particular component, feature, structure, or characteristic is not required to be included.

Reference to terms such as "left", "right", "top", "bottom", "front" and "back" are intended for use in respect to the orientation of the particular feature, structure, or element within the figures depicting embodiments of the invention. It would be evident that such directional terminology with respect to the actual use of a device has no specific meaning as the device can be employed in a multiplicity of orientations by the user or users.

Reference to terms "including", "comprising", "consisting" and grammatical variants thereof do not preclude the addition of one or more components, features, steps, integers, or groups thereof and that the terms are not to be construed as specifying components, features, steps or integers. Likewise, the phrase "consisting essentially of", and grammatical variants thereof, when used herein is not to be construed as excluding additional components, steps, features integers or groups thereof but rather that the additional features, integers, steps, components or groups thereof do not materially alter the basic and novel characteristics of the claimed composition, device or method. If the specification or claims refer to "an additional" element, that does not preclude there being more than one of the additional element.

A "portable electronic device" (PED) as used herein may refer to, but is not limited to, a wireless device used for communications and other applications that requires a battery or other independent form of energy for power. This includes devices, but is not limited to, such as a cellular telephone, smartphone, personal digital assistant (PDA), portable computer, pager, portable multimedia player, portable gaming console, laptop computer, tablet computer, a wearable device, and an electronic reader.

A "fixed electronic device" (FED) as used herein may refer to, but is not limited to, a wireless and/or wired device used for communications and other applications that requires connection to a fixed interface to obtain power. This includes, but is not limited to, a laptop computer, a personal computer, a computer server, a kiosk, a gaming console, a digital set-top box, an analog set-top box, an Internet enabled appliance, an Internet enabled television, and a multimedia player.

A "wearable device" or "wearable sensor" (Wearable Device) as used herein may refer to, but is not limited to, an electronic device that is worn by a user including those under, within, with or on top of clothing and are part of a broader general class of wearable technology which includes "wearable computers" which in contrast are directed to general or special purpose information technologies and media development. Such wearable devices and/or wearable sensors may include, but not be limited to, smartphones, smart watches, e-textiles, smart shirts, activity trackers, smart glasses, environmental sensors, medical sensors, biological sensors, physiological sensors, chemical sensors, ambient environment sensors, position sensors, neurological sensors, drug delivery systems, medical testing and diagnosis devices, and motion sensors.

A "client device" as used herein may refer to, but is not limited to, a PED, FED or Wearable Device upon which a user can directly access a file or files which are stored locally upon the PED, FED or Wearable Device, which are referred to as "local files", and/or a file or files which are stored remotely to the PED, FED or Wearable Device, which are referred to as "remote files", and accessed through one or more network connections or interfaces to a storage device.

A "server" as used herein may refer to, but is not limited to, one or more physical computers co-located and/or geographically distributed running one or more services as a host to users of other computers, PEDs, FEDs, etc. to serve the client needs of these other users. This includes, but is not limited to, a database server, file server, mail server, print server, web server, gaming server, or virtual environment server.

A "software application" (commonly referred to as an "application" or "app") as used herein may refer to, but is not limited to, a "software application", an element of a "software suite", a computer program designed to allow an individual to perform an activity, a computer program designed to allow an electronic device to perform an activity, and a computer program designed to communicate with local and/or remote electronic devices. An application thus differs from an operating system (which runs a computer), a utility (which performs maintenance or general-purpose chores), and a programming tools (with which computer programs are created). Generally, within the following description with respect to embodiments of the invention an application is generally presented in respect of software permanently and/or temporarily installed upon a PED and/or FED.

A "graphical user interface" (GUI) as used herein may refer to, but is not limited to, a form of user interface for a PED, FED, Wearable Device, software application or operating system which allows a user to interact through graphical icons with or without an audio indicator for the selection of features, actions, etc. rather than a text-based user interface, a typed command label or text navigation.

An "enterprise" as used herein may refer to, but is not limited to, a provider of a service and/or a product to a user, customer, or consumer and may include, but is not limited to, a retailer, an online retailer, a market, an online marketplace, a manufacturer, a utility, a Government organization, a service provider, and a third party service provider.

A "service provider" as used herein may refer to, but is not limited to, a provider of a service and/or a product to an enterprise and/or individual and/or group of individuals and/or a device comprising a microprocessor.

A "third party" or "third party provider" as used herein may refer to, but is not limited to, a so-called "arm's length" provider of a service and/or a product to an enterprise and/or individual and/or group of individuals and/or a device comprising a microprocessor wherein the consumer and/or customer engages the third party but the actual service and/or product that they are interested in and/or purchase and/or receive is provided through an enterprise and/or service provider.

A "user" as used herein may refer to, but is not limited to, an individual or group of individuals. This includes, but is not limited to, private individuals, employees of organizations and/or enterprises, members of organizations, men, and women. In its broadest sense the user may further include, but not be limited to, software systems, mechanical systems, robotic systems, android systems, etc. that may be characterised by an ability to exploit one or more embodiments of the invention. A user may also be associated through one or more accounts and/or profiles with one or more of a service provider, third party provider, enterprise, social network, social media etc. via a dashboard, web service, website, software plug-in, software application, and graphical user interface.

"Biometric" information as used herein may refer to, but is not limited to, data relating to a user characterised by data relating to a subset of conditions including, but not limited to, their environment, medical condition, biological condition, physiological condition, chemical condition, ambient environment condition, position condition, neurological condition, drug condition, and one or more specific aspects of one or more of these said conditions. Accordingly, such biometric information may include, but not be limited, blood oxygenation, blood pressure, blood flow rate, heart rate, temperate, fluidic pH, viscosity, particulate content, solids content, altitude, vibration, motion, perspiration, EEG, ECG, energy level, etc. In addition, biometric information may include data relating to physiological characteristics related to the shape and/or condition of the body wherein examples may include, but are not limited to, fingerprint, facial geometry, baldness, DNA, hand geometry, odour, and scent. Biometric information may also include data relating to behavioral characteristics, including but not limited to, typing rhythm, gait, and voice.

"User information" as used herein may refer to, but is not limited to, user behavior information and/or user profile information. It may also include a user's biometric information, an estimation of the user's biometric information, or a projection/prediction of a user's biometric information derived from current and/or historical biometric information.

"Electronic content" (also referred to as "content" or "digital content") as used herein may refer to, but is not limited to, any type of content that exists in the form of digital data as stored, transmitted, received and/or converted wherein one or more of these steps may be analog although generally these steps will be digital. Forms of digital content include, but are not limited to, information that is digitally broadcast, streamed, or contained in discrete files. Viewed narrowly, types of digital content include popular media types such as MP3, JPG, AVI, TIFF, AAC, TXT, RTF. HTML, XHTML, PDF. XLS, SVG, WMA, MP4, FLV, and PPT, for example, as well as others, see for example http://en.wikipedia.org/wiki/List_of_file_formats. Within a broader approach digital content mat include any type of digital information, e.g. digitally updated weather forecast, a GPS map, an eBook, a photograph, a video, a Vine™, a blog posting, a Facebook™ posting, a Twitter™ tweet, online TV, etc. The digital content may be any digital data that is at least one of generated, selected, created, modified, and transmitted in response to a user request, said request may be a query, a search, a trigger, an alarm, and a message for example.

A "profile" as used herein may refer to, but is not limited to, a computer and/or microprocessor readable data file comprising data relating to settings and/or limits of an adult device. Such profiles may be established by a manufacturer/supplier/provider of a device, service, etc. or they may be established by a user through a user interface for a device, a service or a PED/FED in communication with a device, another device, a server or a service provider etc.

A "computer file" (commonly known as a file) as used herein may refer to, but is not limited to, a computer resource for recording data discretely in a computer storage device, this data being electronic content. A file may be defined by one of different types of computer files, designed for different purposes. A file can be opened, read, modified, copied, and closed with one or more software applications an arbitrary number of times. Typically, files are organized in a file system which can be used on numerous different types of storage device exploiting different kinds of media which keeps track of where the files are located on the storage device(s) and enables user access. The format of a file is typically defined by its content since a file is solely a container for data, although, on some platforms the format is usually indicated by its filename extension, specifying the rules for how the bytes must be organized and interpreted meaningfully.

A "local file" as used herein may refer to, but is not limited to, a file, i.e. electronic content, which is stored directly upon a client device, e.g. a PED, FED, or Wearable Device, within a file system of a client device.

A "remote file" as used herein may refer to, but is not limited to, a file, i.e. electronic content, which is stored externally to a client's device and is accessible either through the file system of the client device or through exploitation of one or more protocols for providing a client device with shared file access to the file stored upon a remote storage device. Storing externally to a client's device may include, but not be limited to, storing one or more files on a removable memory storage device which can be connected to the client device, for example a Universal Serial Bus memory (commonly referred to as a memory stick) or an external drive (e.g. external hard disk drive (HDD)) coupled to a wired or wireless interface of the client device. A remote storage device may include, but not be limited to, a remote HDD accessible to the client device via a network, a cloud storage account or cloud storage server accessible via a network (e.g. the Internet, Local Area Network (LAN), etc.) a remote server accessible via a network (e.g. via Ethernet, Wi-Fi, etc.).

"Metadata" as used herein may refer to, but is not limited to, information stored as data that provides information about other data and may include, but not limited to, descriptive metadata, structural metadata, administrative metadata, reference metadata and statistical metadata. Descriptive metadata may describe a resource for purposes such as discovery and identification and may include, but not be limited to, elements such as title, abstract, author, and keywords. Structural metadata relates to containers of data and indicates how compound objects are assembled and may include, but not be limited to, how pages are ordered to form chapters, and typically describes the types, versions, relationships, and other characteristics of digital materials. Administrative metadata may provide information employed in managing a resource and may include, but not be limited to, when and how it was created, file type, technical information, and who can access it. Reference metadata may describe the contents and quality of statistical data whereas statistical metadata may also describe processes that collect, process, or produce statistical data. Statistical metadata may also be referred to as process data.

A "wireless interface" as used herein may refer to, but is not limited to, an interface for a PED, FED, or Wearable Device which exploits electromagnetic signals transmitted through the air. Typically, a wireless interface may exploit microwave signals and/or RF signals, but it may also exploit visible optical signals, infrared optical signals, acoustic signals, optical signals, ultrasound signals, hypersound signals, etc.

A "wired interface" as used herein may refer to, but is not limited to, an interface for a PED, FED, or Wearable Device which exploits electrical signals transmitted through an electrical cable or cables. Typically, a wired interface involves a plug or socket on the electronic device which interfaces to a matching socket or plug on the electrical cable(s). An electrical cable may include, but not be limited, coaxial cable, an electrical mains cable, an electrical cable for serial communications, an electrical cable for parallel communications comprising multiple signal lines, etc.

A "geofence" as used herein may refer to, but is not limited to, a virtual perimeter for a real-world geographic area which can be statically defined or dynamically generated such as in a zone around a PED's location. A geofence may be a predefined set of boundaries which align with a real world boundary, e.g. state line, country etc., or generated boundary such as a school zone, neighborhood, etc. A geofence may be defined also by an electronic device's ability to access one or more other electronic devices, e.g. beacons, wireless antennas etc.

An "artificial intelligence system" (referred to hereafter as artificial intelligence, AI)" as used herein may refer to, but is not limited to, machine intelligence or machine learning in contrast to natural intelligence. An AI may refer to analytical, human inspired, or humanized artificial intelligence. An AI may refer to the use of one or more machine learning algorithms and/or processes. An AI may employ one or more of an artificial network, decision trees, support vector machines, Bayesian networks, and genetic algorithms. An AI may employ a training model or federated learning.

"Machine Learning" (ML) or more specifically machine learning processes as used herein refers to, but is not limited, to programs, algorithms or software tools, which allow a given device or program to learn to adapt its functionality based on information processed by it or by other independent processes. These learning processes are in practice, gathered from the result of said process which produce data and or algorithms that lend themselves to prediction. This prediction process allows ML-capable devices to behave according to guidelines initially established within its own programming but evolved as a result of the ML. A machine learning algorithm or machining learning process as employed by an AI may include, but not be limited to, supervised learning, unsupervised learning, cluster analysis, reinforcement learning, feature learning, sparse dictionary learning, anomaly detection, association rule learning, inductive logic programming.

A "server farm" or server cluster is a collection of computer servers usually maintained by an organization to supply server functionality. The server farm may be owned by an enterprise for its own enterprise requirements, or it may provide software-as-a-service (SaaS) functionality to other enterprises.

Now referring to FIG. 1 there is depicted a schematic 100 of a network to which an Electronic Device 101 supporting Remote Access System (RAS) Systems, Applications and Platforms (SAPs) and RAS-SAP features according to embodiments of the invention is connected. Electronic Device 101 may, for example, be a PED, a FED, or a wearable device and may include additional elements above and beyond those described and depicted. Also depicted in conjunction with the Electronic Device 101 are exemplary internal and/or external elements forming part of a simplified functional diagram of an Electronic Device 101 within an overall simplified schematic of a system supporting SAP features according to embodiments of the invention which include includes an Access Point (AP) 106, such as a Wi-Fi AP for example, a Network Device 107, such as a communication server, streaming media server, and a router. The Network Device 107 may be coupled to the AP 106 via any combination of networks, wired, wireless and/or optical communication links. Also connected to the Network 102 are Social Media Networks (SOCNETS) 165; first and second remote systems 170A and 170B respectively; first and second websites 175A and 175B respectively; first and third 3rd party service providers 175C and 175E respectively; and first to third servers 190A to 190C respectively.

The Electronic device 101 includes one or more Processors 110 and a Memory 112 coupled to Processor(s) 110. AP 106 also includes one or more Processors 111 and a Memory 113 coupled to Processor(s) 210. A non-exhaustive list of examples for any of Processors 110 and 111 includes a central processing unit (CPU), a digital signal processor (DSP), a reduced instruction set computer (RISC), a complex instruction set computer (CISC), a graphics processing unit (GPU) and the like. Furthermore, any of Processors 110 and 111 may be part of application specific integrated circuits (ASICs) or may be a part of application specific standard products (ASSPs). A non-exhaustive list of examples for Memories 112 and 113 includes any combination of the following semiconductor devices such as registers, latches, ROM, EEPROM, flash memory devices, non-volatile random access memory devices (NVRAM), SDRAM, DRAM, double data rate (DDR) memory devices, SRAM, universal serial bus (USB) removable memory, and the like.

Electronic Device 101 may include an audio input element 214, for example a microphone, and an Audio Output Element 116, for example, a speaker, coupled to any of Processor(s) 110. Electronic Device 101 may include an Optical Input Element 218, for example, a video camera or camera, and an Optical Output Element 220, for example an LCD display, coupled to any of Processor(s) 110. Electronic Device 101 also includes a Keyboard 115 and Touchpad 117 which may for example be a physical keyboard and touchpad allowing the user to enter content or select functions within one of more Applications 122. Alternatively, the Keyboard 115 and Touchpad 117 may be predetermined regions of a touch sensitive element forming part of the display within the Electronic Device 101. The one or more Applications 122 that are typically stored in Memory 112 and are executable by any combination of Processor(s) 110. Electronic Device 101 also includes Accelerometer 160 providing three-dimensional motion input to the Processor(s) 110 and GPS 162 which provides geographical location information to Processor(s) 110. as described and depicted below in respect of FIGS. 2 and 3 respectively an Application 122 may support communications with a remote access system allowing one or more remote sessions to be established each associated with one or more Virtual Machines (VMs) allowing non-native applications (e.g. those requiring an Operating System (OS) different to that in execution upon the Processor 110) to be accessed and executed.

Electronic Device 101 includes a Protocol Stack 124 and AP 106 includes an AP Stack 125. Within Protocol Stack 124 is shown an IEEE 802.11 protocol stack but alternatively may exploit other protocol stacks such as an Internet Engineering Task Force (IETF) multimedia protocol stack for example or another protocol stack. Likewise, AP Stack 125 exploits a protocol stack but is not expanded for clarity. Elements of Protocol Stack 124 and AP Stack 125 may be implemented in any combination of software, firmware and/or hardware. Protocol Stack 124 includes an IEEE 802.11-compatible PHY module that is coupled to one or more Tx/Rx & Antenna Circuits 128A and an IEEE 802.11-compatible MAC module which is coupled to an IEEE 802.2-compatible LLC module. Protocol Stack 124 also includes modules for Network Layer IP, a transport layer User Datagram Protocol (UDP), a transport layer Transmission Control Protocol (TCP), a session layer Real Time Transport Protocol (RTP), a Session Announcement Protocol (SAP), a Session Initiation Protocol (SIP) and a Real Time Streaming Protocol (RTSP). Protocol Stack 124 includes a presentation layer Call Control and Media Negotiation module 150, one or more audio codecs and one or more video codecs. Applications 122 may be able to create maintain and/or terminate communication sessions with the Network Device 107 by way of AP 106 and therein via the Network 102 to one or more of Social Networks (SOCNETS) 165; first and second remote systems 170A and 170B respectively; first and second websites 175A and 175B respectively; first and third 3rd party service providers 175C and 175E respectively; and first to third servers 190A to 190C respectively. As described below in respect of FIGS. 2 and 3 a Remote Access System may be executed by and/or accessed by the Electronic Device 101 via the Network 102 on one or more of first and second websites 175A and 175B respectively; first and third 3rd party service providers 175C and 175E respectively; and first to third servers 190A to 190C respectively.

Typically, Applications 122 may activate any of the SAP, SIP, RTSP, and Call Control & Media Negotiation 150 modules for that purpose. Typically, information may propagate from the SAP, SIP, RTSP, Call Control & Media Negotiation 150 to the PHY module via the TCP module, IP module, LLC module and MAC module. It would be apparent to one skilled in the art that elements of the Electronic Device 101 may also be implemented within the AP 106 including but not limited to one or more elements of the Protocol Stack 124, including for example an IEEE 802.11-compatible PHY module, an IEEE 802.11-compatible MAC module, and an IEEE 802.2-compatible LLC module. The AP 106 may additionally include a network layer IP module, a transport layer User Datagram Protocol (UDP) module and a transport layer Transmission Control Protocol (TCP) module as well as a session layer Real Time Transport Protocol (RTP) module, a Session Announcement Protocol (SAP) module, a Session Initiation Protocol (SIP) module and a Real Time Streaming Protocol (RTSP) module, and a call control & media negotiation module. Portable electronic devices (PEDs) and fixed electronic devices (FEDs) represented by Electronic Device 101 may include one or more additional wireless or wired interfaces in addition to or in replacement of the depicted IEEE 802.11 interface which may be selected from the group comprising IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, IMT-1010, DSL, Dial-Up, DOCSIS, Ethernet, G.hn, ISDN, MoCA, PON, and Power line communication (PLC).

The Front End Tx/Rx & Antenna 128A wirelessly connects the Electronic Device 101 with the Antenna 128B on Access Point 206, wherein the Electronic Device 101 may support, for example, a national wireless standard such as GSM together with one or more local and/or personal area wireless protocols such as IEEE 802.11 a/b/g Wi-Fi, IEEE 802.16 WiMAX, and IEEE 802.15 Bluetooth for example. Accordingly, it would be evident to one skilled the art that the Electronic Device 101 may accordingly download original software and/or revisions for a variety of functions. In some embodiments of the invention the functions may not be implemented within the original as sold Electronic Device 101 and are only activated through a software/firmware revision and/or upgrade either discretely or in combination with a subscription or subscription upgrade for example. Accordingly, as will become evident in respect of the description below the Electronic Device 101 may provide a user with access to one or more RAS-SAPs including, but not limited to, software installed upon the Electronic Device 101 or software installed upon one or more remote systems such as those associated with Social Networks (SOCNETS) 165; first to fifth remote systems 170A to 170E respectively; first and second websites 175A and 175B respectively; and first to third 3rd party service provides 175C to 175E respectively; and first to third servers 190A to 190C respectively for example.

Accordingly, within the following description a remote system/server may form part or all of the Social Networks (SOCNETS) 165; first and second remote systems 170A and 170B respectively; first and second websites 175A and 175B respectively; first and third 3rd party service providers 175C and 175E respectively; and first to third servers 190A to 190C respectively. Within the following description a local client device may be Electronic Device 101 such as a PED, FED or Wearable Device and may be associated with one or more of the Social Networks (SOCNETS) 165; first and second remote systems 170A and 170B respectively; first and second websites 175A and 175B respectively; first and third 3rd party service providers 175C and 175E respectively; and first to third servers 190A to 190C respectively. Similarly, a storage system/server within the following descriptions may form part of or be associated within Social Networks (SOCNETS) 165; first and second remote systems 170A and 170B respectively; first and second websites 175A and 175B respectively; first and third 3rd party service providers 175C and 175E respectively; and first to third servers 190A to 190C respectively.

Figure 2:
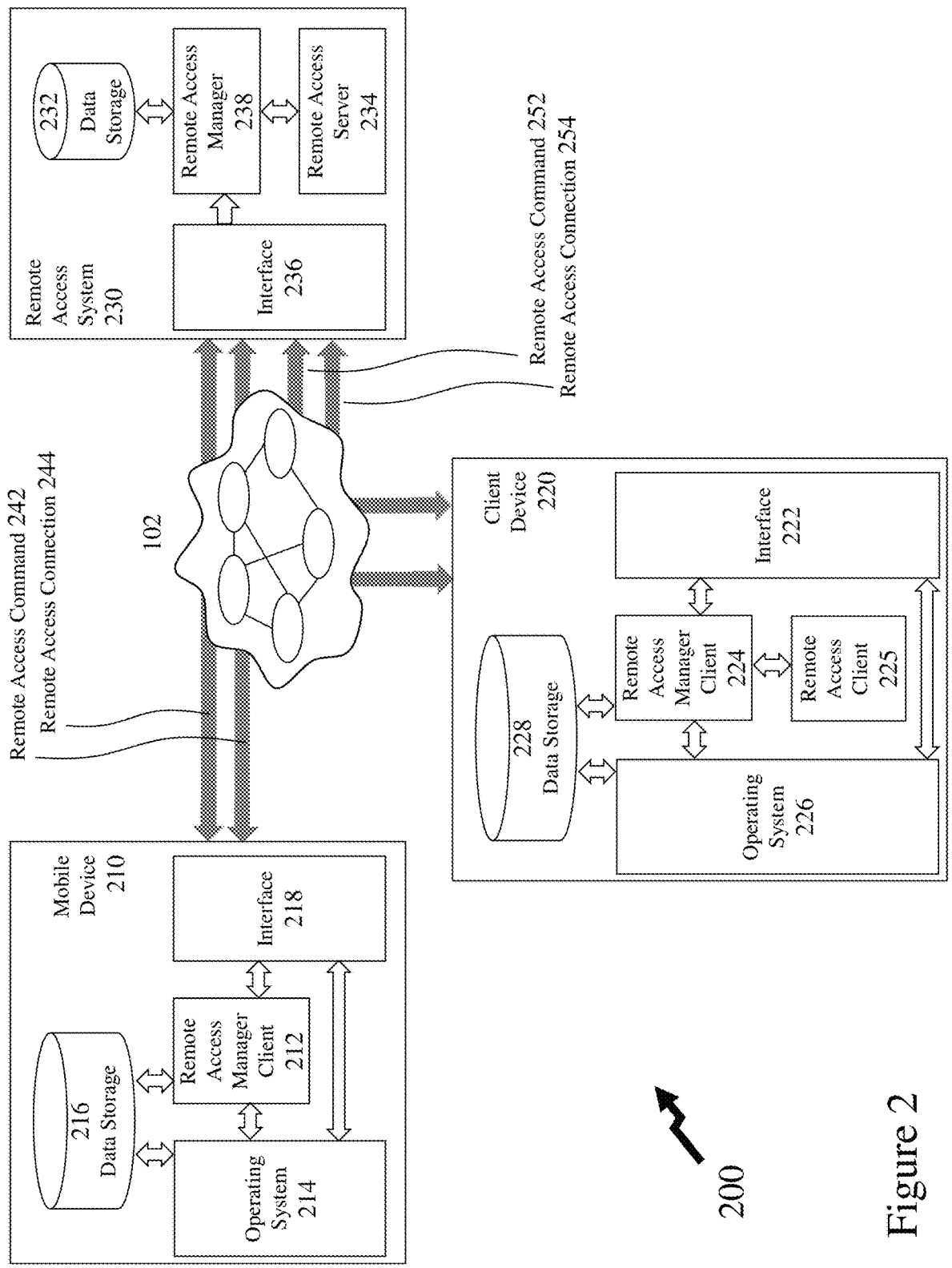
FIG. 2 depicts an exemplary block diagram of a system for initiating or transferring a remote access session between a mobile client and/or a client device and a remote access system supporting embodiments of the invention.

Now referring to FIG. 2 there is depicted a schematic diagram 200 depicting an exemplary configuration for initiating a remote access session for connecting a Mobile Device 210 to a Remote Access System 206 and/or a Client Device 220. As depicted the Mobile Device 210 is in communication with the Remote Access System 230 over a Network 102, such as a local area network (LAN), wide area network (WAN), or the Internet. Further, the Client Device 220 is in communication with the Remote Access System 230 over the Network 102. Optionally, the remote sessions of the Mobile Device 210 and the Client Device 220 are independent sessions. Optionally, within the Remote Access System 230 may transfer a session to the Client Device 220 when the Mobile Device 210 is in proximity to the Client Device 220 where the transferred session is either configured upon an existing established session or is established by the Client Device 220 in dependence upon a communication or communications from the Remote Access System 230. Optionally, the Remote Access System 230 may transfer a session to the Mobile Device 210 from the Client Device 220 when the Mobile Device 210 is initially in proximity to the Client Device 220 and then is moved out of proximity whilst the remote session is still active, where the transferred session is either configured upon an existing established session or is established by the Mobile Device 210 in dependence upon a communication or communications from the Remote Access System 230. The Mobile Device 210 and Client Device 220 may be associated with a common user or with different users. Optionally, the Remote Access System 230 may also host and/or initiate a remote access session at a predetermined time.

The Remote Access System 230 may include one or more computing devices that perform the operations of the Remote Access System 230 and may, for example, be a server such as first to third Servers 190A to 190C respectively individually or in combination. It would be evident that the Mobile Device 210 may be a PED, FED, or Wearable Device. Accordingly, with a session involving only the Mobile Device 210 and the Remote Access System 230 the session is established, maintained and terminated in dependence upon one or more Remote Access Commands 242 over a Remote Access Connection 244 between the Mobile Device 210 and the Remote Access System 230. Accordingly, with a session involving only the Client Device 220 and the Remote Access System 230 the session is established, maintained and terminated in dependence upon one or more Remote Access Commands 224 over a Remote Access Connection 254 between the Client Device 220 and the Remote Access System 230. When the session involves both the Mobile Device 210 and the Client Device 220 with the Remote Access Server then the session is established, maintained and terminated in dependence upon one or more Remote Access Commands 242 over a Remote Access Connection 244 between the Mobile Device 210 and the Remote Access System 230 and one or more Remote Access Commands 224 over a Remote Access Connection 254 between the Client Device 220 and the Remote Access System 230.

In each scenario one or more remote access sessions are established at the Remote Access System 230, either upon or in associated with a server such as first to third Servers 190A to 190C respectively in FIG. 1. The server, e.g. first Server 190A, may include one or more computing devices that perform the operations of the server. The server may be included in the Remote Access System 230 or another system that is separate and/or distinct from the Remote Access System 230 or the Remote Access System 230 may be in execution upon the server. A server application at the server initiates the one or more remote access sessions where initiating a remote access session may include, for example, executing boot-up and/or logon processes, such as running a script that automatically executes when the user logs in to the session, running applications from a folder designated as including applications to be automatically executed when the user logs in to the session, running services that automatically execute when the session starts and/or the user logs in to the session, and/or executing group policies or group policy preferences when the user logs in to the session. Alternatively, the remote access session may start the session and/or log in the user but only execute applications when these are triggered by one or more actions of the user upon the Mobile Device 210 and/or Client Device 220. In some implementations, the server application initiates the remote access session in response to determining that a remote access session has not already been initiated when a request from a device, e.g. Mobile Device 210 and/or Client Device 220, is received.

Figures 3A, 3B:
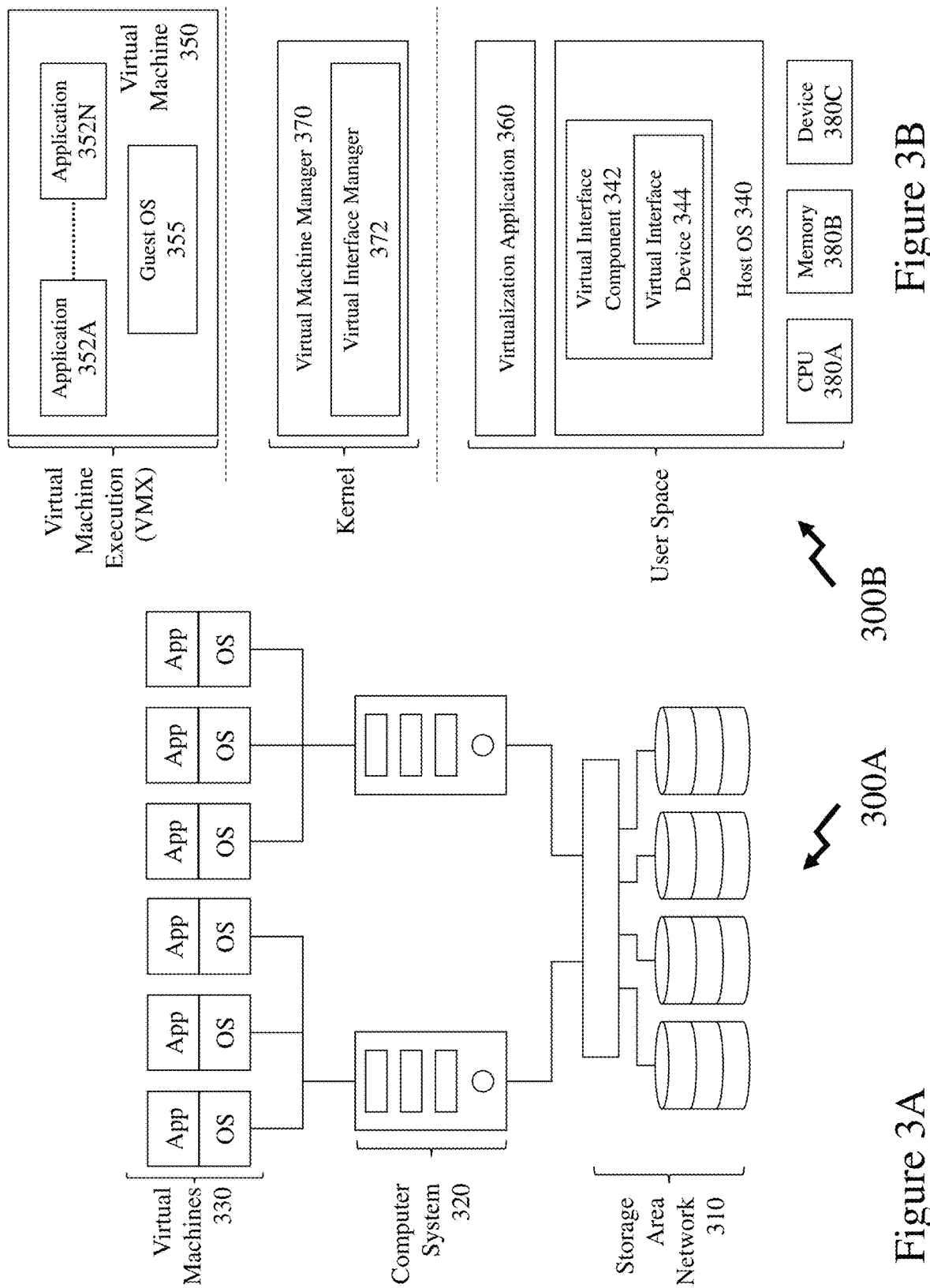
FIG. 3A depicts schematically an architecture of virtual machines as instantiated by remote access sessions supporting embodiments of the invention.
FIG. 3B depicts a high-level diagram of a computer system supporting exemplary virtual machine execution environments supporting one or more aspects and/or embodiments of the invention.

A remote access session may for example be an instance of a Virtual Machines 330 and 350 as described and depicted in FIGS. 3A and 3B respectively, is an instance of a user session or profile in execution upon the Remote Access System 230 which is accessed remotely at the Mobile Device 210 and/or Client Device 220 by a client application in execution upon the respective Mobile Device 210 and/or Client Device 220. The Mobile Device 210 and/or Client Device 220 connects to the Remote Access System 230 and initiates either a new remote access session or accesses an established remote access session either in execution or suspended pending user re-initiation. The remote access session allows the Mobile Device 210 and/or Client Device 220 to access resources of the Remote Access System 230 and therein those of the server(s) forming part of server or server system associated with the Remote Access System 230, such as volatile memory (e.g., random access memory), persistent memory (e.g., a hard drive), a processor (e.g., a central processing unit (CPU) or a graphics processing unit (GPU)), a component or components of an operating system, or an application or applications such as Applications 352A to 352N respectively as depicted in FIG. 3B. One or more of these resources may be physical resources that are accessed through the remote access session (e.g., through a terminal service) and are either directly accessible to the Remote Access System 230 or accessible to the Remote Access System 230 via the Network 102 or another network to which the Remote Access System 230 is also connected. For example, the Remote Access System 230 may be in execution upon a server which forms part of a server farm wherein the Remote Access System 230 can access resources upon or associated with the other servers in the server farm. One or more of these resources may be virtual resources that are accessed through the remote access session (e.g., through remote desktop virtualization via a Virtual Machine). Optionally, the Remote Access System 230 may cause the Mobile Device 210 and/or Client Device 220 to connect to the remote access session, such that a user of the Mobile Device 210 and/or Client Device 220 may then use the remote access session to access the resources and/or applications of the server. Optionally, the user of the Mobile Device 210 and/or Client Device 220 may trigger the connection to the Remote Access System 230 to establish the remote access session so that the user of the Mobile Device 210 and/or Client Device 220 may then use the remote access session to access the resources and/or applications of the server.

Within embodiments of the invention the Mobile Device 210 and/or Client Device 220 may communicate with the Network 102 through a wireless connection, such as a terrestrial wireless communication system (e.g., a cellular data network or one or more Wi-Fi networks) or a satellite system for example. Alternatively, the Mobile Device 210 and/or Client Device 220 may communicate with the Network 102 through a wired connection, such as Ethernet or Internet over cable for example. Alternatively, the Mobile Device 210 and/or Client Device 220 may communicate with the Network 102 through a wireless connection such as depicted in FIG. 1 to a network access point (e.g. Access Point 106) and therein to the Network 102 via Network Device 107 or through a network access point directly to the Network 102.

A remote access session may be possible only within a predetermined geofence, e.g. a Mobile Device 210 associated with user of an enterprise can only successfully establish a remote access session if the Mobile Device 210 is within one or more geofences where each geofence is associated with a location of the enterprise and/or a residence of the user, for example. Similarly, Client Device 206 may be similarly geofenced such that movement of the Client Device 206 inside a geofence allows a remote access session to be established and movement of the Client Device 206 outside of the geofence prevents a remote session being established and/or terminates an existing remote session. The application(s) accessible to the user within a remote access session are determined by whether the Mobile Device 210 and/or Client Device 220 used by the user is within a geofence. A user may define the geofences themselves, e.g. their residence or set it to some default inaccessible geofence (e.g. one of zero radius or the North Pole for example) such that upon loss of the Mobile Device 210 and/or Client Device 220 access to application(s) and/or remote access sessions is prevented. The Mobile Device 210 and/or Client Device 220 may determine their location by one or more means including, but not limited to, accessing a global positioning system (GPS, such as GPS receiver 162 as depicted in FIG. 1), by triangulation with or proximity to signals from one or more antennas with known locations, such as cellular data network towers in a cellular data network or Wi-Fi devices in the Wi-Fi networks. Optionally, the Mobile Device 210 and/or Client Device 220 may establish its location by communicating with another device in its proximity, e.g. a Mobile Device 210 without a GPS may establish a personal area network connection to another device, e.g. a smartphone of the user, and therein obtain its location.

As depicted in FIG. 2 the Mobile Device 210 includes one or more Interfaces 218 to communicate with the Network 102, such as wireless interfaces to a cellular data network, a Wi-Fi network, and/or a satellite system, for example, or a wired interface to an Internet Router, for example. The Mobile Device 210 includes a Remote Access Manager Client 212 that communicates with an Operating System 214 of the Mobile Device 210, for example, to determine a location of the Mobile Device 210 or access one or more applications. an application in execution upon the Mobile Device 210 may trigger the Remote Access Manager Client 212 to access the Remote Access System 230. The Remote Access Manager Client 212 and Operating System 214 can each access Data Storage 216.

Similarly, as depicted in FIG. 2 the Client Device 220 includes one or more Interfaces 222 to communicate with the Network 102, such as wireless interfaces to a cellular data network, a Wi-Fi network, and/or a satellite system, for example, or a wired interface to an Internet Router, for example. The Client Device 220 includes a Remote Access Manager Client 224 that communicates with an Operating System 226 of the Client Device 220, for example, to determine a location of the Client Device 220 or access one or more applications. an application in execution upon the Client Device 220 may trigger the Remote Access Manager Client 224 to access the Remote Access System 230. The Remote Access Manager Client 224 and Operating System 226 can each access Data Storage 216 whilst the Remote Access Manager Client 224 may also access or communicate with Remote Access Client 225.

Similarly, as depicted in FIG. 2 the Remote Access System 230 includes one or more Interfaces 236 to communicate with the Network 102 and a Remote Access Manager 238 which communicates with Data Storage 232 that stores information that identifies or relates to a remote access session associated with the Mobile Device 210 and/or Client Device 220. As depicted the Remote Access Manager 238 communicates via Remote Access Commands 242 over Remote Access Connection 244 between its Interface 236 and Interface 236 of the Mobile Device 210. Similarly, the Remote Access Manager 238 communicates via Remote Access Commands 224 over Remote Access Connection 254 between its Interface 236 and Interface 222 of the Client Device 220. Accordingly, the Mobile Device 210 and/or Client Device 220 can send a remote access command to the Remote Access System 230 to initiate and/or connect to a remote access session or the Remote Access System can send a remote access command to Mobile Device 210 and/or Client Device 220 to initiate and/or connect to a remote access session.

As depicted in FIG. 2 the Remote Access System 230 in addition to the Remote Access Manager 238 and Data Storage 232 includes a Remote Access Server 234 which is hosted at a server that may include one or more computing devices. The server may be included in the Remote Access System 230 or be a system that is separate and/or distinct from the Remote Access System 230. The Remote Access Manager 238 may cause the Remote Access Server 234 to initiate a remote access session. Once connected, a user of the Mobile Device 210 may access resources provided by the server through the Remote Access Connection 244 to the remote access session or a user of the Client Device 220 may access resources provided by the server through the Remote Access Connection 254 to the remote access session.

Within some implementations, the Remote Access Manager Client 212 at the Mobile Device 210 and/or the Remote Access Manager Client 224 at the Client Device 220 receive an input from a user, device, and/or application that includes authentication information, such as a username, password, and/or one-time password. The Remote Access Manager Client 212 and/or the Remote Access Manager Client 224 may provide the authentication information to the Remote Access Manager 238. The Remote Access Manager 238 may condition the sending of the Remote Access Command 242 on having successfully verified authentication information received from the Mobile Device 210 or Remote Access Command 252 on having successfully verified authentication information received from the Client Device 220. This verification, being for example, against corresponding authentication information that is stored at the Remote Access System 230 in the Data Storage 232 or another memory accessible to the Remote Access System 230 (e.g., a username and/or password) and/or calculated by the Remote Access Manager 238 (e.g., a one-time password). In some implementations, the authentication information may include information from a scanner/device, such as biometric data from a biometric scanner and/or biometric device (e.g. a fingerprint, facial scanner, or credential data of the user from a card scanner and/or reader device (e.g. as employed for access control), associated with the Mobile Device 210 and/or Client Device 220 or a location such as a worksite, office, enterprise access point etc. The information provided to the Remote Access System 230 by the Mobile Device 210 and/or Client Device 220 retrieved from the scanner/device may also include information that identifies a user account associated with the successful verification of the user or is retrieved from another system in dependence upon the information retrieved from the scanner/device. This information may be provided as obtained or as processed by a system such as the user's electronic device, e.g. Mobile Device 210 or Client Device 220. This information provided to the Remote Access System 230 may also include information that identifies the scanner/device as well as time and/or date of the information being acquired and/or geographic location information of the scanner/device location, Such a verification providing an alternate means of restricting remote access sessions and/or application executable within a remote access session to geofencing.

In response to successfully verifying the received authentication information, the Remote Access Manager 238 may perform a transformation on the received authentication information and/or additional information, such as by creating a hash of the information, to generate a key. The Remote Access Manager 238 may provide the key to the Remote Access Manager Client 212 at the Mobile Device 210 and/or the Remote Access Manager Client 224 at the Client Device 220. The Remote Access Manager Client 212 may store the key in a Data Storage 216 at the Mobile Device 210. The Remote Access Manager Client 224 may store the key in a Data Storage 228 at the Client Device 220. Alternatively, the Remote Access Manager Client 212 and/or the Remote Access Manager Client 224 may perform a transformation on the authentication information and/or additional information to generate the key and store the key in the Data Storage 216 and/or the Data Storage 228, respectively. The Remote Access Manager Client 212 may provide the key and/or a reverse of the transformation of the key to the Remote Access System 230 for authentication of the Mobile Device 210 by the Remote Access System 230. The Remote Access Manager Client 224 may provide the key and/or a reverse of the transformation of the key to the Remote Access System 230 with subsequent checks for remote access commands for authentication of the Client Device 220 by the Remote Access System 230. The communications between the Mobile Device 210, the Remote Access System 230, and/or the Client Device 220 over the Network 102 may be encrypted.

The authentication information used for authenticating the Remote Access Manager Client 224 at the Client Device 220 with the Remote Access Manager 238 at the Remote Access System 230 may be the same authentication information that is used to authenticate the Remote Access Client 225 with the Remote Access Server 234 or alternatively it may be separate and/or distinct.

In response to the Remote Access Manager Client 224 receiving the Remote Access Command 254, the Remote Access Manager Client 224 may instruct the Remote Access Client 225 to connect to the remote access session provided by the Remote Access Server 234 in the background of a user profile for the Client Device 220. Optionally, a user interface of the Client Device 220 may be locked requiring the user to provide authentication information to the Client Device 220 to unlock the user interface for the user profile where the Remote Access Client 225 establishes the Remote Access Connection 244 to the remote access session. Similarly, Remote Access Manager Client 212 receiving the Remote Access Command 242, the Remote Access Manager Client 212 may connect to the remote access session provided by the Remote Access Server 234 in the background of a user profile for the Mobile Device 210. Optionally, a user interface of the Mobile Device 210 may be locked requiring the user to provide authentication information to the Mobile Device 210 to unlock the user interface for the user profile where the Remote Access Manager Client 212 establishes the Remote Access Connection 254 to the remote access session.

The Remote Access Manager 238 may send a command to the Remote Access Server 234 to disconnect from a remote access session, for example, once the Remote Access Manager 238 has verified that the Remote Access Server 234 has completed a remote access session or upon receiving a Remote Access Command 242 from Mobile Device 210 or Remote Access Command 254 from Client Device 220 to terminate a remote access session. the Remote Access Manager 238 and/or Remote Access Server 234 may receive a Remote Access Command 242 from Mobile Device 210 or Remote Access Command 254 from Client Device 220 to log-off a remote access session such that the associated Remote Access Connection 244 or 232 is terminated but the processing upon the Remote Access System 230 and/or Remote Access Server 234 is not terminated. Accordingly, a remote access session may be initiated to establish a process, e.g. a numerical simulation within a computer aided design application, where the connection is not required to be maintained until the user wishes to access the results of the process. Similarly, the Remote Access Manager 238 and/or Remote Access Server 234 may receive a Remote Access Command 242 from Mobile Device 210 or Remote Access Command 254 from Client Device 220 to suspend a remote access session such that the associated Remote Access Connection 244 or 232 is terminated and the processing upon the Remote Access System 230 and/or Remote Access Server 234 suspended pending subsequent re-initiation of the remote access session.

Referring to FIG. 3A there is depicted a schematic architecture 300A supporting embodiments of the invention. As depicted a plurality of virtual machines (VMs) 130 are associated with a plurality of Computer Systems 320 which are themselves associated with a storage area network (SAN) 310. The plurality of Computer Systems 320 may be directly connected or indirectly connected via one or more communications networks to the 310, such as Network 102 in FIGS. 1 and 2. Accordingly, each VM 130 may employ virtual memory pages which are mapped to physical memory pages upon the 310. A Computer System 320 may be connected to one or more SANs 110. Whilst the descriptions in respect of FIGS. 3A to 3B are described with respect to a Computer System 320 hosting one or more VMs 330 it would be evident that these may be supported by a PED, a FED, a WED, a server or a WES directly or indirectly through communications within one of the plurality of Computer Systems 320. A computer system 320 may itself be a PED, a FED, a WED, a server, or a WES. Accordingly, a computer system 320 may, as depicted in FIG. 3B, support a virtual machine execution (VMX) environment as a host system directly or indirectly or it may include a virtual machine monitor (VMM) facilitating execution of one or more VMs, each of which may, as depicted in FIG. 3B, run a guest operating system (OS) 355 to manage one or more Guest Applications 352A to 352N respectively. Accordingly, a Computer System 320 may be a Remote Access System 230 and SAN 310 may be Data Storage 232 as depicted in FIG. 2. In this manner, a remote session established by a user may support one or more VMs 330 and therein a guess OS 355 and one or more Guest Applications 352A to 352N as depicted in FIG. 3B.

FIG. 3B depicts a high-level diagram of a computer system (host system) 300B supporting exemplary VMX environments supporting one or more aspects and/or embodiments of the present disclosure. The Host System 300B, e.g. Computer System 320 in FIG. 3A or Remote Access System 230 in FIG. 2, may include one or more central processing units (CPU) 380A communicatively coupled to one or more memory devices 380B and one or more peripheral devices 380C via a system bus, not depicted for clarity. The Host System 300B may implement a virtual execution environment for executing the software developed for a platform that is different from the native platform of the Host System 300B. In certain implementations, the virtual execution environment may be implemented using certain hardware-assisted virtualization features of the CPU 180A, which may support executing, at an elevated privilege level one or more elements, including but not limited to, a VMM 370 that manages one or more VMs. In various implementations, the VMM 370 may be implemented as a kernel module, a kernel extension, a driver, or a part of the Host Operating System (OS) 340. The Host OS 340 may further include a virtual interface component 142 which virtualizes a virtual interface component 142 to manage one or more Virtual Interface Devices 344 for use by the VM 350 and/or Host OS 340.

The VMM 370 may present a VM 350 with an abstraction of one or more virtual processors, while retaining selective control of processor resources, physical memory, interrupt management, and input/output (I/O). The VMM 370 may also present a VM 350 with an abstraction of one or more Virtual Interface Devices 344 of the Virtual Interface Component 342. A VM 350 may implement a software environment which may be represented by a stack including a Guest OS 355 and one or more applications 155A-155N. Each VM 350 may operate independently of other VMs and use the VMM-facilitated interface to the processors, memory, storage, graphics, and I/O provided by the Host System 300B. The VMM 370 may include a Virtual Interface Manager 372 to receive instructions to create a communication channel between a Host OS 340 and a Guest OS 355. The Virtual Interface Manager 372 may also send a request to Host OS 340 to create a Virtual Interface Device 344 and provide the Virtual Interface Device 144 to Guest OS 355. In considering VMX operation then there are two kinds of VMX operation commonly referred to, namely VMX root operation and VMX non-root operation. In general, a VMM, such as VMM 370 in FIG. 3B, will run in VMX root operation and guest software, such as Guest OS 355 and Applications 352A to 352N will run in VMX non-root operation. Transitions between VMX root operation and VMX non-root operation are called VMX transitions. There are two kinds of VMX transitions, those into VMX non-root operation from VMX operation are called VM entries whilst those from VMX non-root operation to VMX root operation are called VM exits.

Accordingly, a user may, for example, remotely access from either their PED, e.g. Mobile Device 210 in FIG. 2, and/or FED, e.g. Client Device 220 in FIG. 2, applications upon a remote system, e.g. Remote Access System 230 in FIG. 2, wherein a remote session they establish instantiates one or more instances of a Virtual Machine, such as Virtual Machine (VM) 350 in FIG. 3, to execute the application(s) the user wishes to execute. By virtue of exploiting VMs 350 then the operating system for these applications may be different from or the same as that of the operating system of the user's electronic device. Accordingly, the VM 350 operating system, Guest OS 355, for each VM 350 instantiated may be established as one of Linux, Windows, Android, and iOS, for example, which may be the same as or different to the operating system of the user's device, e.g. Mobile Device 210 or Client Device 220.

Referring to FIG. 4 there is depicted an exemplary graphical user interface (GUI) 400 within a software application showing accounts associated with a system and the permissions associated with the accounts. Accordingly, as depicted within GUI 400 there are depicted first to fourth fields 410 to 440 comprising:

First field 410 relating to "paul@prls.dev" which is identified as a user and has "root" administration permissions;

Second field 420 relating to "pippo" which is similarly identified as a user and has "custom" permissions;

Third field 430 relating to "ian@prls.dev.local" which is similarly identified as a user and has "power" permissions; and Fourth field 440 relating to "Administrators" which is identified as a group having "root administration" privileges.

Accordingly, the software application may be a remote access system (RAS) software application (RAS-App) providing users from a mobile device, such as Mobile Device 210 in FIG. 2, or a user device, such as Client Device 220 in FIG. 2, with access to software applications upon a remote system, e.g. Remote Access System 230 in FIG. 2, via one or more Virtual Machines, such as described and depicted in respect of FIGS. 3A and 3B respectively. The RAS-App may, for example, support three levels of administration permissions, these being:

"Root" wherein the user(s) or group(s) having these permissions can do anything;

"Power" wherein the user(s) or group(s) having these permissions are allowed top level permissions within a defined set of allowed sites; and "Custom" wherein the user(s) or group(s) having these permissions established by an administrator per user or per group where these will generally, but not necessarily, be a set of minimum permissions for that user or group.

Figure 6:
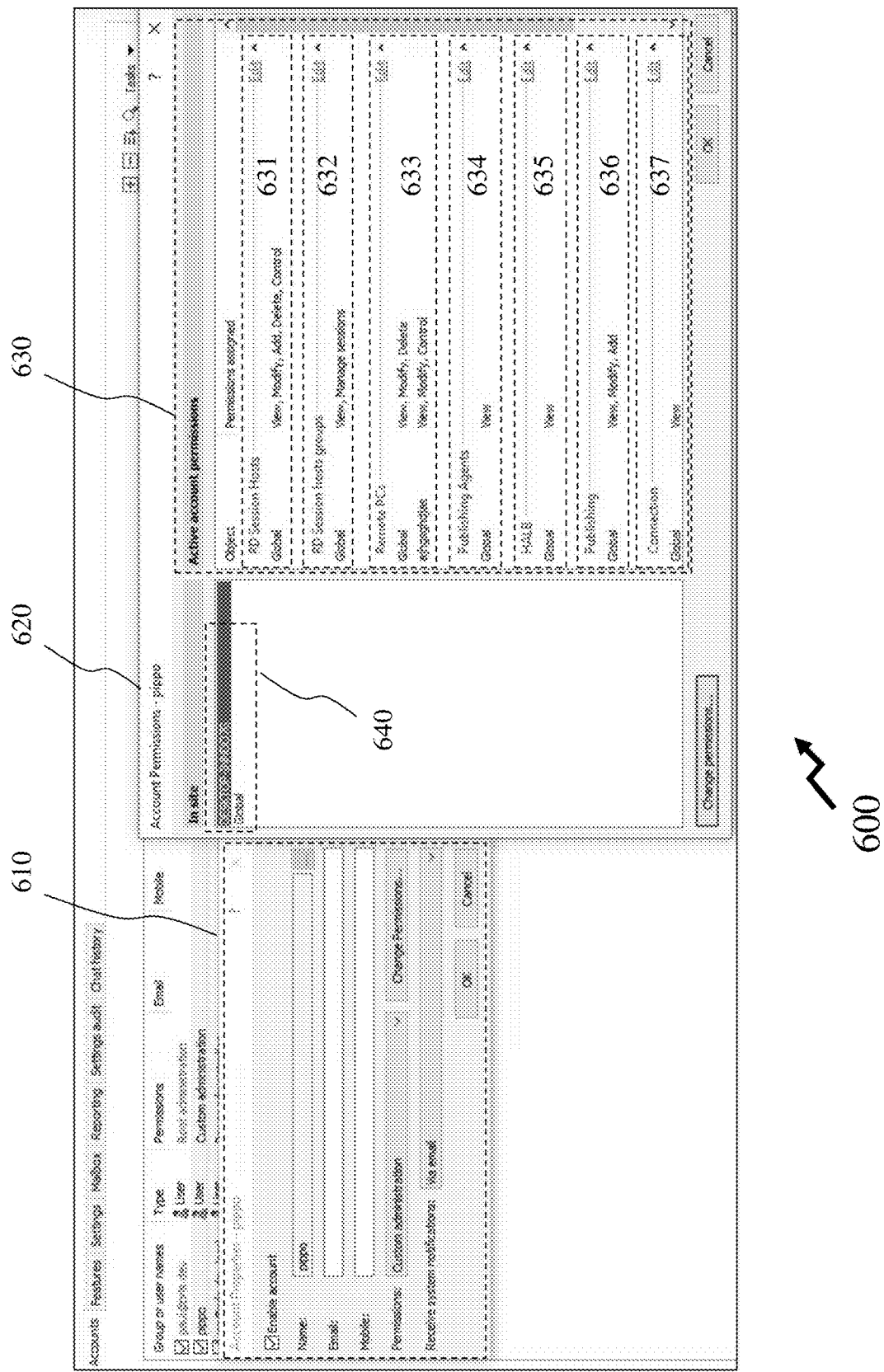
FIG. 6 depicts an exemplary GUI within a software application providing users with access to remote access systems and virtual machines upon remote systems showing active account permissions for an account within the accounts listed in FIG. 4.

The defined set of allowed sites may, for example, be defined by an administrator of a user and/or group or it may be defined for all users having a specific common aspect of their username. Accordingly, for example, referring to FIG. 4 the first and third fields 410 and 430 share the common domain "prls.dev" wherein all users with this domain within their username having the power administration permissions have the same defined set of allowed sites. Alternatively, within other embodiments of the invention the allowed set of sites may be defined by the remote access system that they access. However, as evident from FIGS. 5 and 6 respectively the account permissions may be significantly more complex.

Within GUI 400 the fourth field 440 relates to "Administrators" of the software application. For example, this software application may be a RAS-App which allows multiple administrators to login and manage a system wherein different administrators may have different roles, e.g. Infrastructure Management, Applications/Desktop Delivery, Help Desk, Manufacturing, Delivery, Regulatory, etc. according to the enterprise, service provider, third party service provider, regulator, Government organization etc. owning the software application, e.g. RAS-App. Whilst the ensuing embodiments of the invention are described and depicted with respect to a RAS-App and a single remote access system, e.g. Remote Access System 230 in FIG. 2, the remote access system may be single tenant, e.g. hosting only software applications, data, features etc. relating to a single enterprise, service provider, third party service provider, regulator, Government organization, website, SOCNET etc. upon a single server; or it may be a single tenant farm, e.g. hosting only software applications, data, features etc. relating to a single enterprise, service provider, third party service provider, regulator, Government organization, website, SOCNET etc. but upon a plurality of servers (a server farm); multi-tenant, e.g. hosting software applications, data, features etc. relating to multiple enterprises, service providers, third party service providers, regulators. Government organizations, websites, SOCNETs etc. upon a single server; or a multi-tenant farm, e.g. hosting software applications, data, features etc. relating to multiple enterprises, service providers, third party service providers, regulators, Government organizations, websites, SOCNETs etc. upon a plurality of servers (a server farm). Where multiple tenants exploit a single server or a server farm then each tenant will have its own permissions for its own administrator(s)/user(s)/group(s) which will be independent from those of other tenants. However, the owner of the single server or server farm may also have administrator(s) with their own permissions relating to the management of the single server and/or server farm. Accordingly, as will become evident the number of permissions for an administrator/user/group may become complex.

As discussed in FIG. 4 with respect to GUI 400 only three levels of administration permissions were associated with the group(s)/user(s). However, referring to FIG. 5 there is depicted an exemplary List 500 of permissions which can be assigned to a user or class of users and their associated levels thereby increasing the complexity of establishing these permissions initially and subsequently managing them and therefore to which embodiments of the invention are directed. Accordingly, within List 500 each permission is associated with one or more levels, these being:

Network, wherein this permission if set for this level allows the user(s)/(groups) to exploit this permission upon any system connected to the network to which the user(s)/group(s) has access, e.g. their enterprise's network or their enterprise's servers and/or server farms as accessible through a dedicated network or through the Internet, for example, thereby allowing them to manage at this level;

System, wherein this permission if set for this level allows the user(s)/(groups) to exploit this permission upon a named system which may be a single device, single server or a server farm, for example, allowing them to manage at this level; and Application, wherein this permission if set for this level allows the user(s)/(groups) to exploit this permission upon using this application at a specific file level, for example.

As depicted in List 500 there are 10 different specific permissions, these being Create, Enumerate, Read, Write, Control, Delete, Sign, Hierarchy, Map and Network. Accordingly, as depicted in List 500 this user (or users, or class of users) has:

Network assigned to the permissions of Enumerate, Control, Map, and Network;

System assigned to the permissions of Enumerate, Control, Hierarchy and Map;

Application assigned to the permissions of Create, Enumerate, Read, Write, Control, Delete, Sign, and Hierarchy.

Accordingly, even at this level the permissions for a user may be complex. However, it would be evident that the user permissions may be significantly more complex as the permissions for a user may vary with each application, each system, each network. For example, a user may have the permissions to read/write/delete within a word processing application but can only read within a SaaS financial software application. Alternatively, a user may have permissions to read/write/delete on their own device but only read/write on a remote access system. Accordingly, an administrator may be presented with a significant task of adding a new user to a system. Within the prior art an administrator is provided with software tools to allow them to establish these permissions such as exemplary GUI 600 in FIG. 6 which relates to a remote access system, e.g. Parallels™ RAS, whereby the administrator manages the permissions for users to access remote access systems and virtual machines upon remote systems showing active account permissions for an account within the accounts listed in FIG. 4, this being "pippo" as defined within second Field 420 in GUI 400 who has custom administration permissions. Accordingly, as evident in GUI 600 the administrator has accessed the "pippo" account in first Pop-Up 610 wherein the administrator can set up the username and associate an email and/or mobile phone number to the username, configure how system notifications are delivered and establish the level of permissions, in this instance "Custom administration" and change the permissions. If the administrator selects the button "Change Permissions" then second Po-Up 620 appears showing within left list 640 the different systems/networks etc. associated with the user that they have access to, referred to as In Site within the language of the application to which GUI 600 relates, these being "DESKTOP-INNDO7G" (e.g. access via a specific identified client device) and "Global" (e.g. remote access via any local or mobile client). Upon selecting "DESKTOP-INNDO7G" right list 630 is provided to the administrator indicating all the permissions set for this user and system combination. These being, as depicted, RD Session Host permissions 631, RD Session hosts groups 632, Remote PCs 633, Publishing Agents 634, HALB 635, Publishing 636 and Connection 637. Against ach are depicted the associated objects, the permissions assigned, and a hyperlink allowing the admin to edit these permissions. Against Remote PCs are listed two lower level objects, "Global" and "ajhgsghdjas" such that permissions can be varied even by each object at this level below the higher level object "DESLTOP-INNDO7G." Accordingly, for the lower level object "Global" within the "In Site" "DESKTOP-INNDO7G" the user "pippo" has View, Modify and Delete permissions but for the "ajhgsghdjas" lower level object under the same "In Site" "DESKTOP-INNDO7G" the user "pippo" has View, Modify and Control. Accordingly, the number of permissions a user or class of user can have may vary significantly from a small number of permissions to 10, 50 or 100 or more. Accordingly, it is evident from GUI 600 that a single user can have permissions established in a hierarchy of objects, e.g. an upper level object such as "DESKTOP-INNDO7G" as depicted and lower level objects "Global" and "ajhgsgsdjas." Whilst only two levels of hierarchy are depicted in GUI 600 and two lower level objects described it would be evident that the number of levels of the hierarchy and the number of discrete objects within each level may vary. However, as will become evident embodiments of the invention support automated and semi-automated permissions management within such complex hierarchies.

Further, it would be evident that some permissions may be dependent on other permissions. Such complexities can mean that even administrators with experience may need to consult with documentation in order to fully understand what permissions required for a particular user, class of users, role etc. that the administrator is creating, modifying etc.

Figures 7, 8:
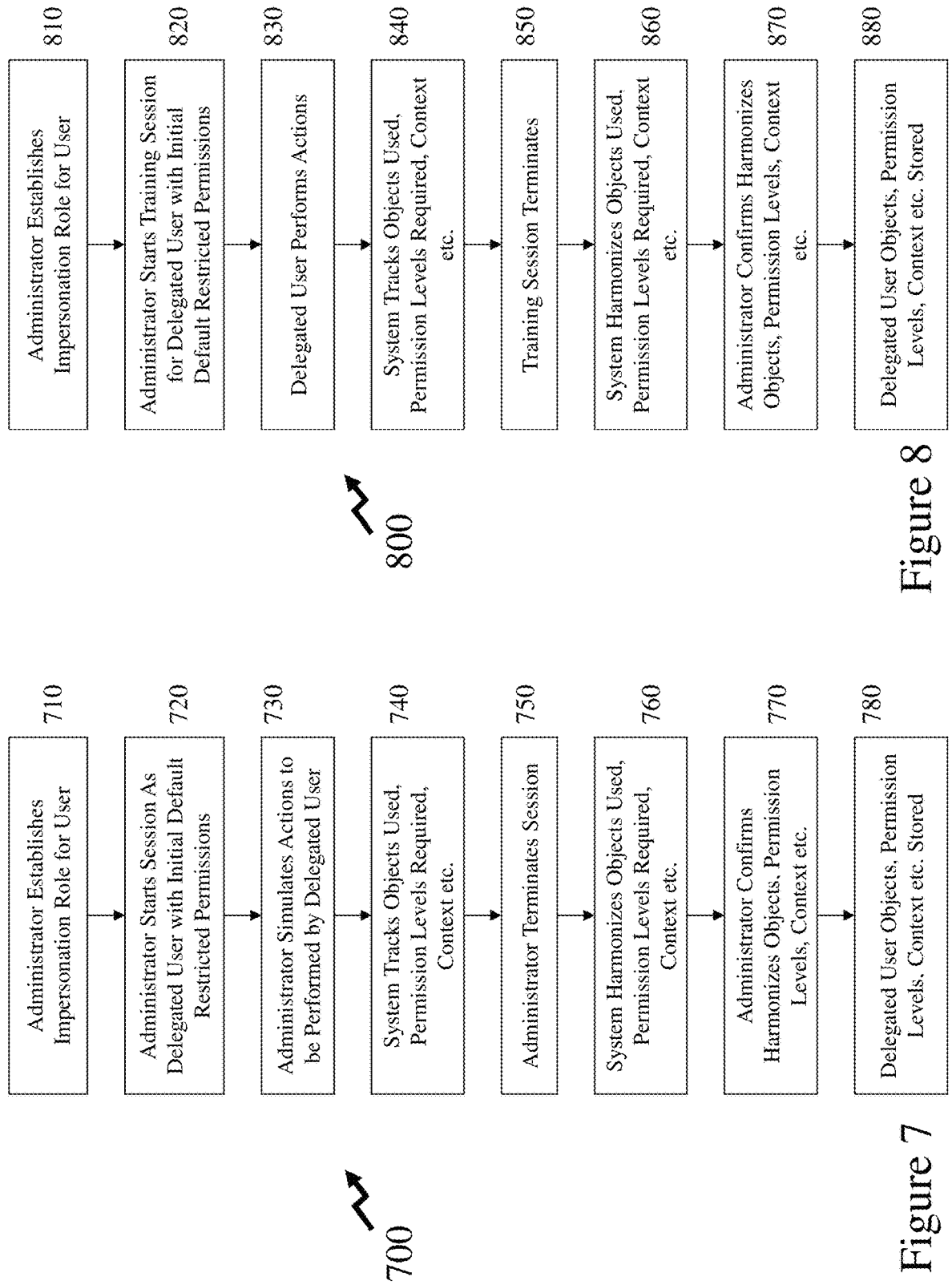
FIG. 7 depicts an exemplary flow according to an embodiment of the invention for an administrator establishing permissions for a user or class of users by temporarily assigning an administrator role to the user or class of users for a set period of time where the administrator establishes the permissions during this set period of time.
FIG. 8 depicts an exemplary flow according to an embodiment of the invention for an administrator establishing permissions for a user or class of users by temporarily assigning an administrator role to the user or class of users for a set period of time where a user establishes the permissions during this set period of time.

Referring to FIG. 7 there is depicted an exemplary process flow, Flow 700, according to an embodiment of the invention for an administrator establishing permissions for a user or class of users by temporarily assigning an administrator role to the user or class of users for a set period of time where the administrator establishes the permissions during this set period of time. As depicted Flow 700 comprises first to eighth steps 710 to 780 respectively, these being:

First step 710 wherein an administrator establishes an impersonation role for a user (referred to as delegated user) that they are to establish the set of permissions for;
Second step 720 wherein the administrator starts an impersonation session as the delegated user using the impersonation role with an initial default set of permissions;
Third step 730 wherein the administrator simulates actions to be performed by the delegated user within the impersonation session as the delegated user;
Fourth step 740 wherein the system tracks the objects used by the administrator in their impersonation session as the delegated user and tracks the permission levels, context etc. for each of the objects employed;
Fifth step 750 wherein the administrator terminates the impersonation session as the delegated user;
Sixth step 760 wherein the system harmonizes the objects used together with the required permission levels, contexts, etc.;
Seventh step 770 wherein the system provides the administrator with the harmonized objects, permission levels, contexts, etc. and the administrator confirms them;
Eighth step 780 wherein the objects, permission levels, context etc. established and verified by the administrator within impersonation session as the delegated user are stored against the user (i.e. by a specific username).

Within second step 720 the initial default set of permissions may be a restricted set such that as the administrator proceeds restrictions are removed as appropriate by the addition of new permissions. Alternatively, the initial default set of permissions may be an open set such that as the administrator proceeds and the system harmonizes the system removes permissions which are not required. This approach may with very complex permission sets allow the administrator to save time as they do not have to add any permissions to perform actions with respect to objects, applications etc. Within another embodiment of the invention the initial default set of permissions may be associated with a role the user will perform which have previously been defined. Accordingly, the administrator and system in proceeding would add/remove permissions as appropriate through the delegated session and harmonization steps as appropriate.

The harmonization process in sixth step 760 may, for example, align permissions for objects within the same level of the object hierarchy. Within embodiments of the invention the objects may be associated with physical hardware, e.g. a local client device, a mobile client device, a server, a cluster of servers, a server farm etc., or they may be associated with software and/or firmware including for example, published applications accessible on physical hardware through a virtual machine and/or remote application session including, but not limited to, office software, messaging software, payroll processing software, database management software, management software, computer aided design (CAD) software, development software, gamification or gaming software, virtualization software, accounting software, collaboration software, customer relationship management (CRM) software, management information software (MIS), enterprise resource planning (ERP) software, financial software, human resource management (HRM) software, learning management software, content management (CM) software, geographic information software (GIS), and service desk management software. Within embodiments of the invention an object may include a website or a portion of a website, a social network, a social media network, etc. Accordingly, the permissions may relate to objects associated with software as a service" (SaaS), cloud computing, infrastructure as a service (IaaS), platform as a service (PaaS), desktop as a service (DaaS), managed software as a service (MSaaS), mobile backend as a service (MBaaS), datacenter as a service (DCaaS), and information technology management as a service (ITMaaS), for example.

Within Flow 700 an initial default set of objects may be associated which are then modified, deleted, added to etc. by the administrator's actions within the impersonation session. This default set of objects may be no objects, a defined set of objects or all objects associated with an enterprise, organization, etc. to which the user belongs who will subsequently exploit these objects.

Optionally, the impersonator performing the impersonation role within Flow 700 may be performed by another user (e.g. a manager of the user familiar with the user's role, tasks etc.) or be performed by an artificial intelligence engine which has been trained using recorded sessions of other users of the system. Each recorded session including data relating to the user's role as well as data relating to the objects used, their permission levels, context etc. Optionally, a combination of two or more of the administrator of the system, another user, and the artificial intelligence engine may be employed.

Now referring to FIG. 8 there is depicted an exemplary process flow, Flow 800, according to an embodiment of the invention for an administrator establishing permissions for a user or class of users by temporarily assigning an administrator role to the user or class of users for a set period of time where a user establishes the permissions during this set period of time. As depicted Flow 800 comprises first to eighth steps 810 to 880 respectively, these being:

First step 810 wherein an administrator establishes an impersonation role for a user (delegated user) for whom the set of permissions are to be established for;

Second step 820 wherein the administrator starts a training session for the delegated user with an initial default set of permissions;

Third step 830 wherein the delegated user performs actions within the training session;

Fourth step 840 wherein the system tracks the objects used by the delegated user in their training session and tracks the permission levels, context etc. for each of the objects employed;

Fifth step 850 wherein the training session terminates;

Sixth step 860 wherein the system harmonizes the objects used together with the required permission levels, contexts, etc.;

Seventh step 870 wherein the system provides the administrator with the harmonized objects, permission levels, contexts, etc. and the administrator confirms them;

Eighth step 880 wherein the objects, permission levels, context etc. established and verified by the administrator within training session as the delegated user are stored against the user (i.e. by a specific username).

Within second step 820 the initial default set of permissions may be a restricted set such that as the administrator proceeds restrictions are removed as appropriate by the addition of new permissions. Alternatively, the initial default set of permissions may be an open set such that as the administrator proceeds and the system harmonizes the system removes permissions which are not required. This approach may with very complex permission sets allow the administrator to save time as they do not have to add any permissions to perform actions with respect to objects, applications etc. Within another embodiment of the invention the initial default set of permissions may be associated with a role to which the user will perform which have previously been defined. Accordingly, the administrator and system in proceeding would add/remove permissions as appropriate through the delegated session and harmonization steps as appropriate.

The harmonization process in sixth step 860 may, for example, align permissions for objects within the same level of the object hierarchy. Within embodiments of the invention the objects may be associated with physical hardware, e.g. a local client device, a mobile client device, a server, a cluster of servers, a server farm etc., or they may be associated with software and/or firmware including for example, published applications accessible on physical hardware through a virtual machine and/or remote application session including, but not limited to, office software, messaging software, payroll processing software, database management software, management software, computer aided design (CAD) software, development software, gamification or gaming software, virtualization software, accounting software, collaboration software, customer relationship management (CRM) software, management information software (MIS), enterprise resource planning (ERP) software, financial software, human resource management (HRM) software, learning management software, content management (CM) software, geographic information software (GIS), and service desk management software. Within embodiments of the invention an object may include a website or a portion of a website, a social network, a social media network, etc. Accordingly, the permissions may relate to objects associated with software as a service" (SaaS), cloud computing, infrastructure as a service (IaaS), platform as a service (PaaS), desktop as a service (DaaS), managed software as a service (MSaaS), mobile backend as a service (MBaaS), datacenter as a service (DCaaS), and information technology management as a service (ITMaaS), for example.

Within Flow 800 an initial default set of objects may be associated which are then modified, deleted, added to etc. by the user's and administrator's actions within the training session. This default set of objects may be no objects, a defined set of objects or all objects associated with an enterprise, organization, etc. to which the user belongs who will subsequently exploit these objects.

Termination of the training session 850 may be, for example, after a predetermined time has elapsed from the training session starting, at the discretion of the administrator, or another criteria established by the system, administrator, enterprise associated with the user etc.

It would be evident that the impersonation session and training session are not mutually exclusive. Accordingly, an administrator may establish an initial set of objects/permissions through an impersonation session which then subsequently forms the baseline for a training session with the user.

Figure 9:
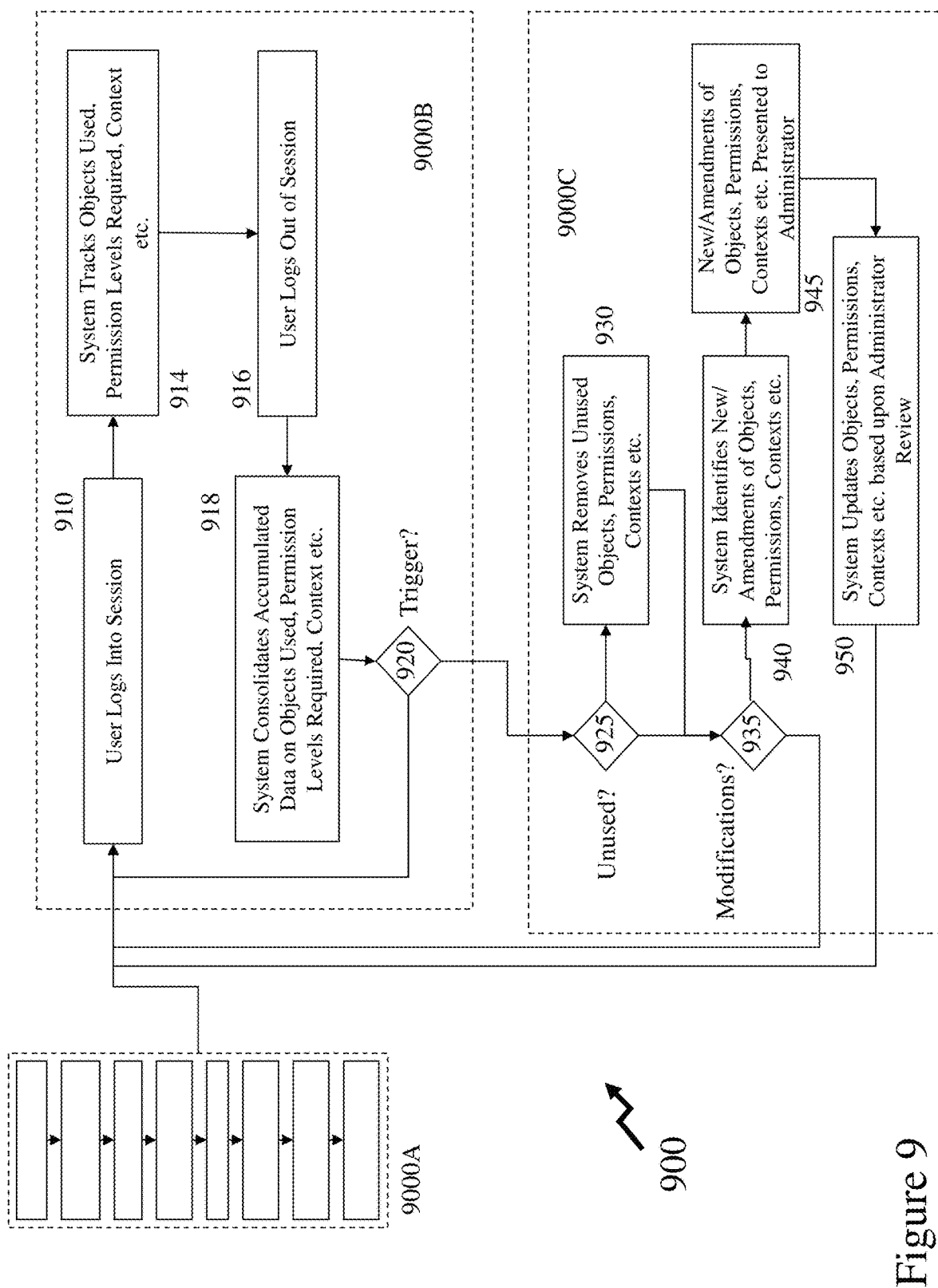
FIG. 9 depicts an exemplary flow according to an embodiment of the invention for the modification of permissions associated with a user or class of users.

Referring to FIG. 9 there is depicted an exemplary process flow, Flow 900, according to an embodiment of the invention for the modification of permissions associated with a user or class of users. As depicted Flow 900 comprises first to third Sub-Flows 700A to 700C respectively. First Sub-Flow 900A being a process to establish the permissions for a user such as Flow 700 in FIG. 7 or Flow 800 in FIG. 8, for example. From first Sub-Flow 9000A the Flow 900 proceeds to second Sub-Flow 9000B comprising first to fifth steps 910 to 920 respectively, these being:

- First step 910 wherein the user for whom permissions were established in first Sub-Flow 9000A logs in for one or more sessions;
- Second step 914 wherein the system tracks the objects used, permission levels required, context etc.; and
- Third step 916 wherein the user logs out to the session;
- Fourth step 918 wherein the system accumulates this data on the objects, permission levels, context etc.; and
- Fifth step 920 wherein a trigger condition is assessed to determine whether the process should proceed to third Sub-Flow 9000C or loop back for further session(s) by the user.

The trigger in fifth step 920 may be, for example, a number of session logins, a predetermined period of time, an enterprise triggered requirement, an administrator decision, etc.

Third Sub-Flow 9000C as depicted comprises sixth to eleventh steps 925 to 950 respectively, comprising:

- Sixth step 925 wherein the process from second Sub-Flow 9000B determines whether there are unused objects, permissions, contexts, etc. or not and proceeds to either seventh step 930 upon a positive determination or eighth step 935 upon a negative determination;
- Seventh step 930 wherein the system removes (e.g. deletes or suspends) unused objects, permissions, contexts, etc. either automatically or through a process employing administrator and/or user review before proceeding to eighth step 935;
- Eighth step 935 wherein a determination is made as to whether there are new or modifications to the objects, permissions, contexts, etc. or not and proceeds to either ninth step 940 upon a positive determination or loops back to first step 910 in second Sub-Flow 9000B;
- Ninth step 940 wherein the system identifies the new objects, permissions, contexts, etc. or the modifications to the existing objects, permissions, contexts, etc. and proceeds to tenth step 945;
- Tenth step 945 wherein the identified new objects, permissions, contexts, etc. or the modifications to the existing objects, permissions, contexts, etc. are presented to the administrator for review; and
- Eleventh step 950 wherein based upon the administrator's decisions with respect to the identified new objects, permissions, contexts, etc. or the modifications to the existing objects, permissions, contexts, etc. are updated into the system and Flow 9000 proceeds back to first step 910 in first Sub-Flow 9000A.

Within the preceding descriptions with respect to FIGS. 7 to 9 respectively the context of a user's activity with respect to objects and their associated permissions has been identified as being established and stored in conjunction with the objects, permissions, etc. Within embodiments of the invention this context may include, but not limited to, the following contexts:

- operational context (OLC), referring to the operational and/or external environment which may, for example, be the combined hardware/firmware/software configuration for the user's access and/or use of the object;
- human factor context, relating to the user which may be categorized as information on the user (knowledge of habits, emotional state, biometric data etc.), the user's social environment (co-location of other users etc. for example, and the user's tasks (e.g. is the activity spontaneous, regular, periodic, etc.);
- physical environment context which may be categorized as location (e.g. absolute position, relative position, co-location etc.), infrastructure (e.g. surrounding resources for computation, communication, task performance), and physical conditions (e.g. noise, light, pressure, air quality etc.);
- temporal context which may include, for example, date, time, duration of use of object(s) and/or permission(s) etc.; and
- verification context which may include identification of a type of verification of the user's identity required prior to granting a permission or set of permissions associated with an object.

The type of verification associated with verification context may include, but not be limited to, password, username, biometric, and geolocation (and/or geofence). Within embodiments of the invention therefore the tracking/assignment of/revocation of permissions may be discretized (or be viewed as having granularity) to each permission rather than all permissions associated with an object as may be the context associated with the permission. Hence, for example a user may have a first permission to associated with an object (e.g. a system) to read which is granted based upon their login credentials but a second permission associated with the object to delete requires a biometric verification, e.g. fingerprint. Accordingly, the granularity may be different contexts to each permission, or a context associated with a set of permissions.

Figure 10:
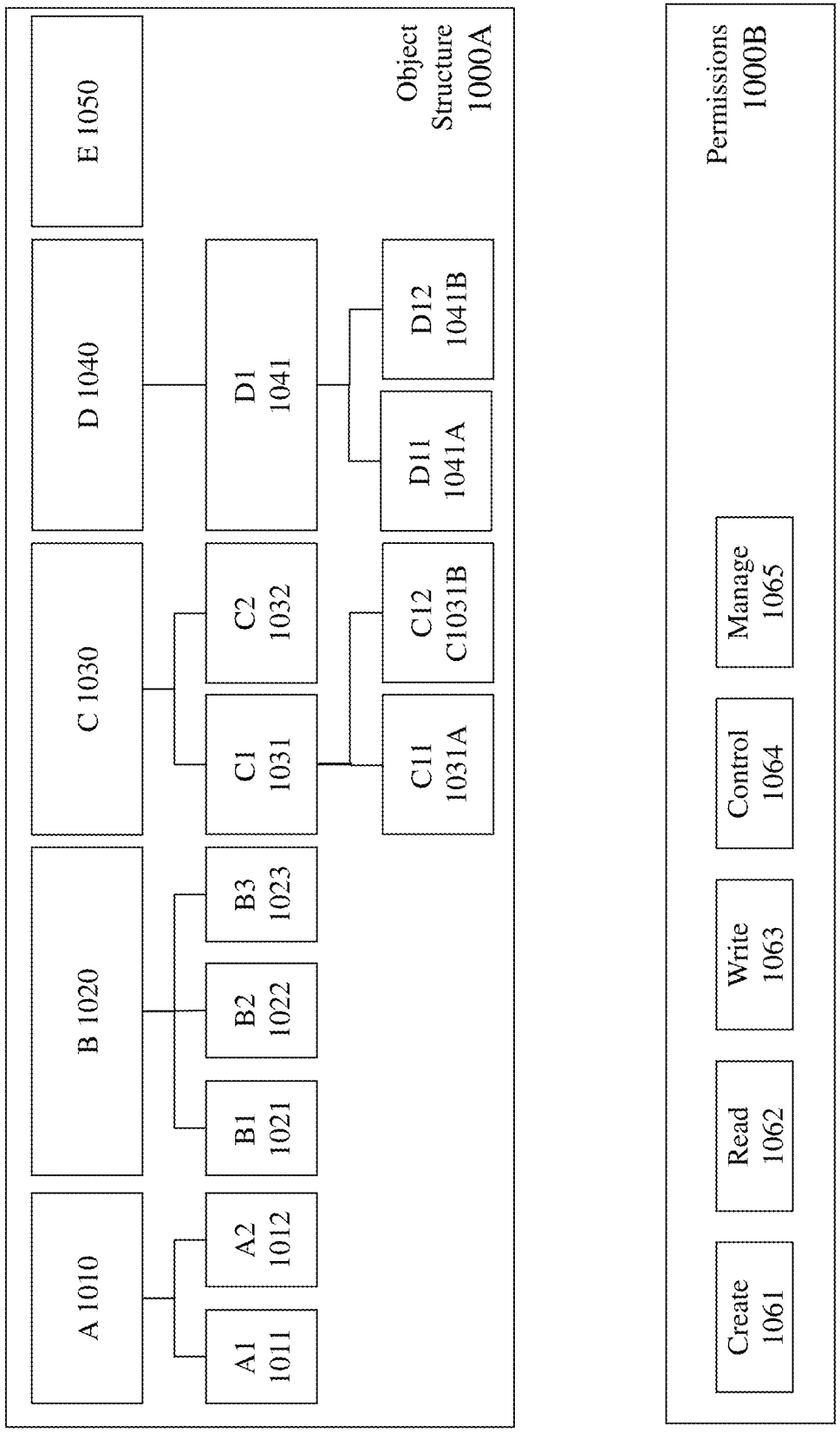
FIG. 10 depicts an exemplary clean audit according to an embodiment of the invention for permissions associated with a user or class of users for different objects associated with the user, class of users, session, remote session etc.

Referring to FIG. 10 there is depicted a Schematic 1000 for an exemplary clean audit according to an embodiment of the invention for permissions associated with a user or class of users for different objects associated with the user, class of users, session, remote session etc. As noted in respect of Flows 700 and 800 in FIGS. 7 and 8 respectively then the impersonation session or training session begins with an initial set of default permissions and no objects. However, as noted above this initial set of permissions may be none whilst an initial set of default objects may be defined. Accordingly, in schematic 1000, in what the inventors refer to as a clean audit as there are no permissions set, there is depicted an initial default set of objects prior to any impersonation session and/or training session.

As depicted in Schematic 1000 the audit comprises an Object Structure 1000A and Permissions 1000B. Within Object Structure 1000A there are depicted:

- First to fifth top level objects (TLOs) A to E 1010 to 1050 respectively;
- First and second intermediate level objects (ILOs) A1 1011 and A2 1012 associated with Object A 1010;
- Third to fifth ILOs 1021 to 1023 associated with TLO B 1020;
- Sixth and seventh ILOs 1031 and 1032 associated with third TLO 1030;
- Eighth ILO 1041 associated with fourth 1040;
- First and second bottom level objects (BLOs) C11 1031A and C12 1031B;
- Third and fourth BLOs D11 1041A and D12 1041B.

Permissions 1000B comprising Create 1061, Read 1062, Write 1063, Delete 1064 and Manage 1065 respectively.

Accordingly, a process such as described and depicted with respect to Flows 700 and/or 800 in FIGS. 7 and 8 respectively is executed to establish the permissions of the user. The resulting exemplary audit is depicted by Schematic 1100 in FIG. 11 wherein the permissions associated with a user or class of users for different objects associated with the user, class of users, session, remote session etc. after execution of an automated or semi-automated permissions management process such as Flows 700 and/or 800 in FIGS. 7 and 8 respectively. As depicted in Schematic 1100 the audit now comprises an Object Structure 1100A with Permissions 1000B. Within Object Structure 1100A there are depicted the following changes to the initial clean audit depicted in Schematic 1000 in FIG. 10:

First ILOs) A1 1011 is now first ILO 1111 with associated permissions Create and Read;

Fifth ILO is now second ILO 1123 with associated permissions Create and Read Sixth ILO 1031 is now third ILO 1131 with associated permissions Create, Read and Write;

Eighth ILO 1041 is now fourth ILO 1141 with associated permission Delete;

First BLO C11 1031A is now first BLO C11 1131A with associated permissions Read and Write;

Second BLO C12 1031B is now second BLO C12 1131B with associated permissions Read and Write;

Third BLO D11 1041A is now third BLO D11 1141A with associated permission Create; and Fourth BLO D12 1041B is now fourth BLO D12 1141B with associated permissions Create and Manage.

Figure 11:
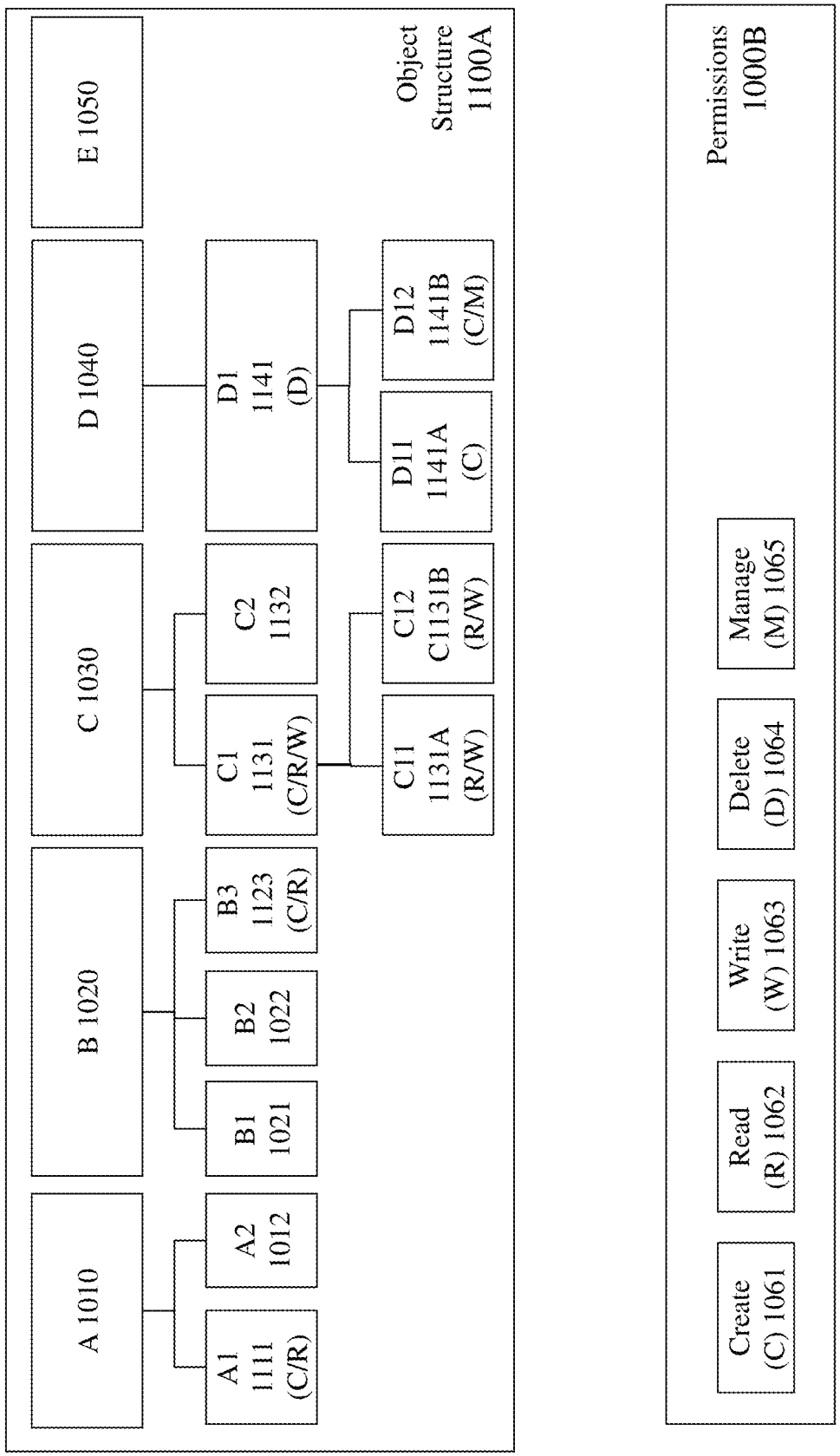
FIG. 11 depicts an exemplary audit according to an embodiment of the invention for permissions associated with a user or class of users for different objects associated with the user, class of users, session, remote session etc. after execution of an automated or semi-automated permissions management process such as depicted in FIGS. 7 and 8 respectively.

Hence, the automated or semi-automated permissions management process such as Flows 700 and/or 800 in FIGS. 7 and 8 respectively provide the user with an initial requisite set of permissions through either an impersonation session and/or training session respectively. Subsequently, as depicted in FIGS. 12 and 13 this exemplary audit as depicted in Schematic 1100 in FIG. 11 is updated after execution of an automated or semi-automated permissions management process such as depicted in Flow 900 in FIG. 9.

Figure 12:
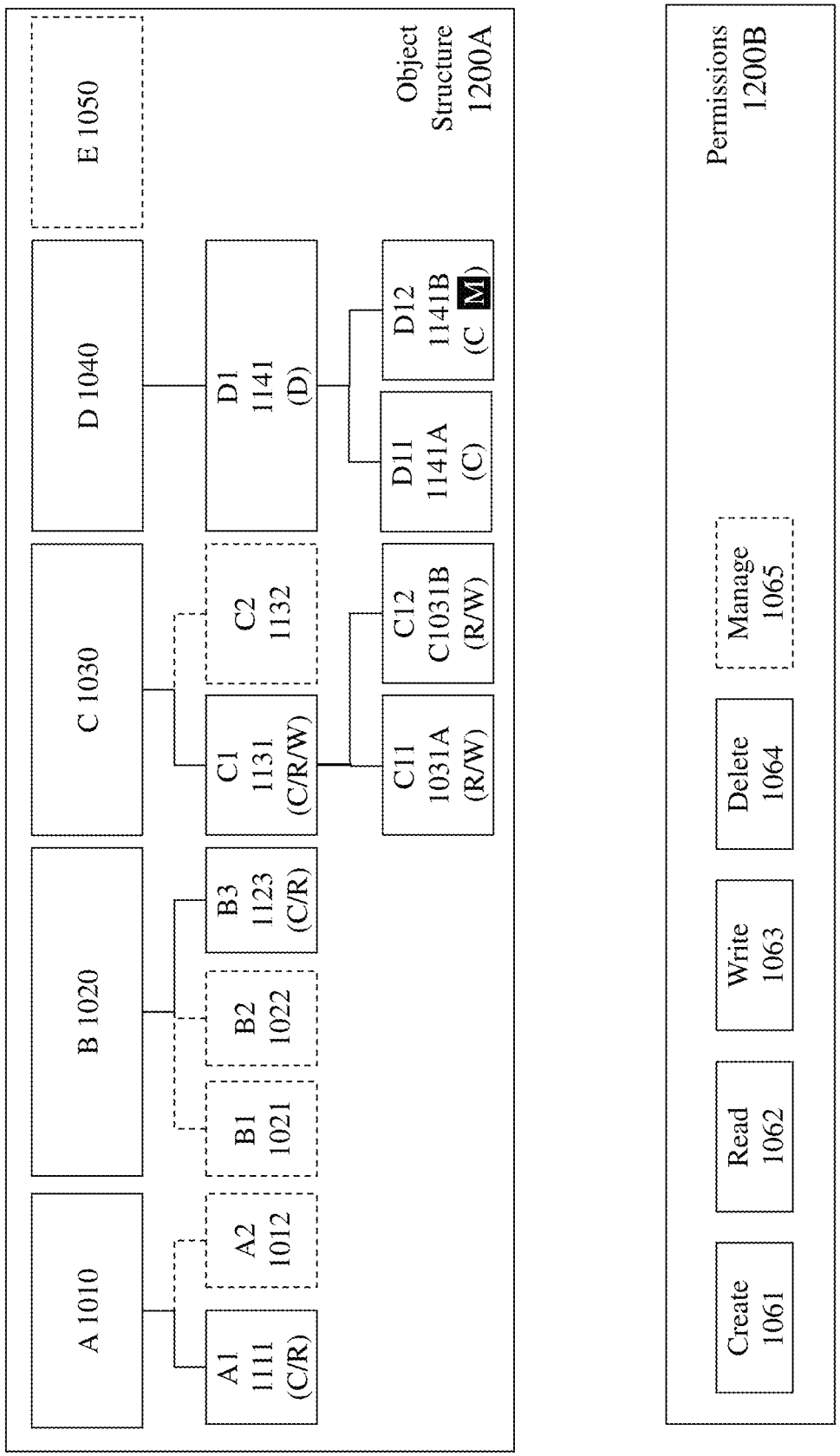
FIGS. 12 and 13 depict exemplary audits according to an embodiment of the invention for permissions associated with a user or class of users for different objects associated with the user, class of users, session, remote session etc. after execution of an automated or semi-automated permissions management process such as depicted in FIG. 9.
Figure 13:
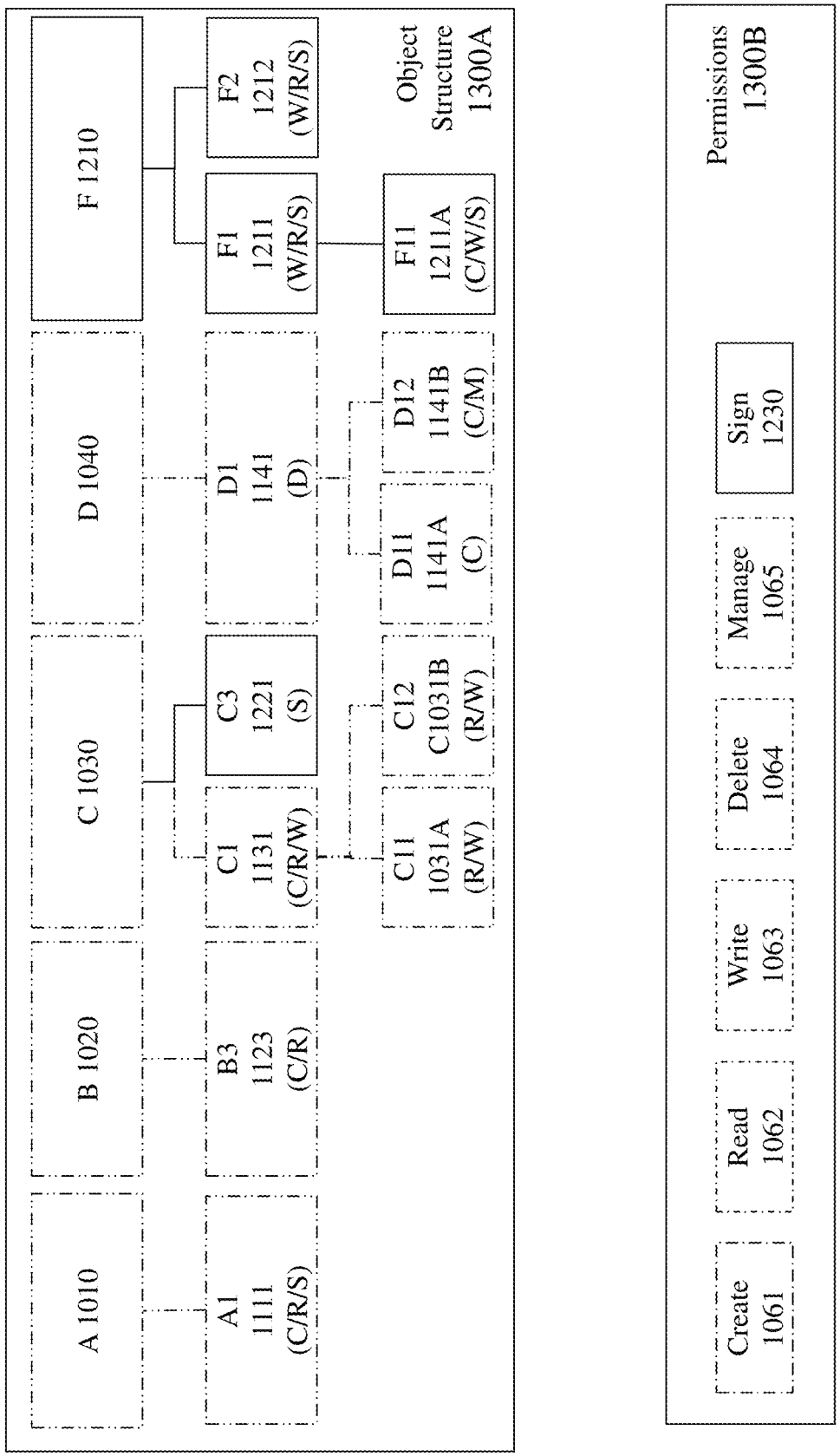

Referring initially to Schematic 1200 in FIG. 12 the audit now comprises Object Structure 1200A with Permissions 1200B. For comparison by a reader of the specification the following objects which were established as being unused have been depicted with dashed lines and permissions removed are depicted in white text against a black background. Accordingly, the resulting changes for Schematic 1200 relative to Schematic 1100 are:

Deletion of fifth TLO 1050;

Deletion of second ILO A2 1010;

Deletion of third and fourth ILOs B1 1021 and B2 1022 respectively;

Deletion of seventh ILO C2 1132; and

Deletion of permission "Manage" within fourth BLO D12 1141B.

Accordingly, these objects and permissions established initially have been subsequently determined as not being employed by the user and are accordingly removed from the objects/permissions associated with that user.

In contrast in Schematic 1300 in FIG. 13 the audit now comprises Object Structure 1300A and Permissions 1200B which for this instance represent a subsequent point in time to that of the audit depicted in Schematic 1200 in FIG. 13. Accordingly, for comparison by a reader of the specification those objects remaining in Schematic 1200 are depicted with dashed lines and those objects and their permissions added are depicted in solid lines. Accordingly, the resulting additions depicted in Schematic 1300 within Object Structure 1300A are:

New TLO F 1210;

First new ILO F1 1211 with permissions Read, Write, and Sign;

Second new ILO F2 1212 with permissions Read, Write, and Sign; and

New BLO F11 1211A with permissions Create, Write and Sign.

The resulting addition depicted in Schematic 1300 within Permissions 1300B being the addition of the new permission Sign 1230. Accordingly, these objects and permissions which were not established initially have been subsequently determined as being employed by the user and are accordingly added from the objects/permissions associated with that user. Within the prior art typically a user would have to request Within FIGS. 7 to 9 the Flows 700 to 900 are described and depicted as employing a verification step employing an administrator. The inventors refer to this as a semi-automated process as the steps of tracking objects, permissions, context etc. are automatically performed by one or more systems exploiting embodiments of the invention but employ a human verification step. However, it would be evident that a completely automated process may be employed wherein the system tracking and harmonizing objects, permissions, contexts etc. or an ancillary system associated with the system tracking and harmonizing objects, permissions, contexts, etc. exploits one or more rules to automate the step of administrator verification. Within embodiments of the invention the one or more rules may be established by an administrator initially or another individual, organization, enterprise etc.

Within other embodiments of the invention the one or more rules may be established by an artificial intelligence engine associated with the system tracking and harmonizing objects, permissions, contexts etc. or an ancillary system associated with the system tracking and harmonizing objects, permissions, contexts, etc. exploiting one or more machine learning algorithms and/or one or more artificial intelligence processes. Within an embodiment of the invention the artificial intelligence engine may employ an initial learning phase prior to a use phase wherein the learning phase employs one or more sets of user profiles including objects, permissions, and/or contexts. Within this learning phase the artificial engine may associate permissions and/or contexts with a class of object rather than specific objects and then apply these associated permissions and/or contexts to each object identified within the use phase that are associated with that class of object.

Within an embodiment of the invention, the artificial intelligence engine may establish a role to which the class of objects, objects, permissions and/or contexts are associated and thereafter employ the class of objects, objects, permissions and/or contexts with for a new user defined as having that role. Accordingly, the process may be automated completely with such an artificial intelligence engine.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps, and means described above may be done in various ways. For example, these techniques, blocks, steps, and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages and/or any combination thereof. When implemented in software, firmware, middleware, scripting language and/or microcode, the program code or code segments to perform the necessary tasks may be stored in a machine readable medium, such as a storage medium. A code segment or machine-executable instruction may represent a procedure, a function, a subprogram, a program, a routine, a subroutine, a module, a software package, a script, a class, or any combination of instructions, data structures and/or program statements. A code segment may be coupled to another code segment or a hardware circuit by passing and/or receiving information, data, arguments, parameters and/or memory content. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor and may vary in implementation where the memory is employed in storing software codes for subsequent execution to that when the memory is employed in executing the software codes. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other mediums capable of storing, containing, or carrying instruction(s) and/or data.

The methodologies described herein are, in one or more embodiments, performable by a machine which includes one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, a typical machine may be exemplified by a typical processing system that includes one or more processors. Each processor may include one or more of a CPU, a graphics-processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD). If manual data entry is required, the processing system also includes an input device such as one or more of an alphanumeric input unit such as a keyboard, a pointing control device such as a mouse, and so forth.

The memory includes machine-readable code segments (e.g. software or software code) including instructions for performing, when executed by the processing system, one of more of the methods described herein. The software may reside entirely in the memory, or may also reside, completely or at least partially, within the RAM and/or within the processor during execution thereof by the computer system. Thus, the memory and the processor also constitute a system comprising machine-readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be, for example, a computer, a server, a cluster of servers, a cluster of computers, a web appliance, a distributed computing environment, a cloud computing environment, or any machine capable of executing a set of instructions (sequential or otherwise) that specify actions to be taken by that machine. The term "machine" may also be taken to include any collection of machines that individually or jointly execute a set (or multiple sets) of instructions to perform any one or more of the methodologies discussed herein.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method comprising:

executing upon a system comprising at least a microprocessor an automatic monitoring phase with respect to a current profile of the user based upon actions of the user upon the system;

consolidating accumulated data on the objects, permissions and contexts employed by the user during the automatic monitoring phase; and modifying the current profile of the user to generate an updated profile in dependence upon the consolidated accumulated data acquired during the automatic monitoring phase; wherein the current profile comprises a set of harmonized objects, permissions, and contexts associated with the user stored within a memory accessible to the microprocessor; and the harmonized objects, permissions, and contexts within the current profile were established within a session upon the system via a process comprising:

establishing upon the system an impersonation role for a delegated user to act as an impersonator of the user of the system;

executing by the impersonator a session as the user of the system; and monitoring or simulating a plurality of actions within the session undertaken by the impersonator within the session where each action is an action to be performed by the user and is associated with an object forming part of the system, a permission for performing the action upon the object, and a context of the action upon the object.

2. A method comprising:

executing upon a system comprising at least a microprocessor an automatic monitoring phase with respect to a current profile of the user based upon actions of the user upon the system;

consolidating accumulated data on the objects, permissions and contexts employed by the user during the automatic monitoring phase; and modifying the current profile of the user to generate an updated profile in dependence upon the consolidated accumulated data acquired during the automatic monitoring phase; wherein the current profile comprises a set of harmonized objects, permissions, and contexts associated with the user stored within a memory accessible to the microprocessor; and the harmonized objects, permissions, and contexts within the current profile were established within a session upon the system via a process comprising:

establishing upon the system a training session for the user of the system by a delegated user of the system;

executing the training session by the user; and monitoring a plurality of actions within the session undertaken by the user within the training session where each action is an action associated with an object forming part of the system, a permission for performing the action upon the object, and a context of the action upon the object.

3. A method comprising:

executing upon a system comprising at least a microprocessor an automatic monitoring phase with respect to a current profile of the user based upon actions of the user upon the system;

consolidating accumulated data on the objects, permissions and contexts employed by the user during the automatic monitoring phase; and modifying the current profile of the user to generate an updated profile in dependence upon the consolidated accumulated data acquired during the automatic monitoring phase; wherein the current profile comprises a set of harmonized objects, permissions, and contexts associated with the user stored within a memory accessible to the microprocessor; and modifying the current profile of the user is performed by applying a process comprising:

removing unused objects, permissions and objects from the profile of the user in dependence upon the consolidated accumulated data on the objects, permissions and contexts employed by the user; and adding new objects, permissions and objects established in dependence upon the consolidated accumulated data on the objects, permissions and contexts employed by the user.

4. A method comprising:

executing upon a system comprising at least a microprocessor an automatic monitoring phase with respect to a current profile of the user based upon actions of the user upon the system;

consolidating accumulated data on the objects, permissions and contexts employed by the user during the automatic monitoring phase; and modifying the current profile of the user to generate an updated profile in dependence upon the consolidated accumulated data acquired during the automatic monitoring phase; wherein the current profile comprises a set of harmonized objects, permissions, and contexts associated with the user stored within a memory accessible to the microprocessor; and modifying the current profile of the user is performed by applying a process comprising:

establishing modifications to the objects, permissions, and contexts which are either new objects, permissions, and contexts or amendments to objects, permissions, and contexts within the current profile of the user;

rendering the modifications to the objects, permissions, and contexts to the delegated user; and receiving one or more indications from the delegated user upon the system; wherein each indication of the one or more indications relates to a portion of the modifications to the objects, permissions, and contexts to accept; and updating the profile of the user with those portions of the modifications to the objects, permissions, and contexts associated with each indication of the one or more indications.

5. A method comprising:

executing upon a system comprising at least a microprocessor an automatic monitoring phase with respect to a current profile of the user based upon actions of the user upon the system;

consolidating accumulated data on the objects, permissions and contexts employed by the user during the automatic monitoring phase; and modifying the current profile of the user to generate an updated profile in dependence upon the consolidated accumulated data acquired during the automatic monitoring phase; wherein the current profile comprises a set of harmonized objects, permissions, and contexts associated with the user stored within a memory accessible to the microprocessor;

each object within the harmonized objects, permissions, and contexts is an object is an element of a remote access system;

each permission within the harmonized objects, permissions, and contexts relates to use of a software application provided by a virtual machine in execution upon the remote access system; and each context within the harmonized objects, permissions, and contexts relates to the user when using the software application.

* * * * *